(12) United States Patent
Weidner et al.

(10) Patent No.: US 10,680,457 B2
(45) Date of Patent: Jun. 9, 2020

(54) SYSTEMS, METHODS, AND APPARATUS IMPLEMENTING HYBRID SYMMETRIC AND ASYMMETRIC CONTROL FOR SOFT SWITCHING IN WIRELESS POWER TRANSFER APPLICATIONS

(71) Applicant: WiTricity Corporation, Watertown, MA (US)

(72) Inventors: Felix Weidner, Munich (DE); Martin Pavlovsky, Munich (DE)

(73) Assignee: WiTricity Corporation, Watertown, MA (US)

( * ) Notice: Subject to any disclaimer, the term of this patent is extended or adjusted under 35 U.S.C. 154(b) by 335 days.

(21) Appl. No.: 14/809,942

(22) Filed: Jul. 27, 2015

(65) Prior Publication Data
US 2017/0033586 A1   Feb. 2, 2017

(51) Int. Cl.
  *H02J 7/02*   (2016.01)
  *H02M 3/337*  (2006.01)
  (Continued)

(52) U.S. Cl.
  CPC .............. *H02J 7/025* (2013.01); *B60L 53/12* (2019.02); *H02J 50/12* (2016.02); *H02J 50/80* (2016.02);
  (Continued)

(58) Field of Classification Search
  None
  See application file for complete search history.

(56) References Cited

U.S. PATENT DOCUMENTS 6,031,747 A * 2/2000 Ilic ................... H02M 3/285
                                                      363/21.12
8,674,551 B2  3/2014  Low et al.
(Continued)

FOREIGN PATENT DOCUMENTS

WO   WO-2014042681 A2   3/2014
WO   WO-2014108785 A1   7/2014

OTHER PUBLICATIONS

Saichol et al , An Improved LLC Resonant Inverter for Induction Heating with Asymmetrical Control,Jul. 2009, IEEE International Symposium on Industrial Electronics. pp. 1612-1617.*
(Continued)

*Primary Examiner* — Drew A Dunn
*Assistant Examiner* — Tynese V McDaniel
(74) *Attorney, Agent, or Firm* — Knobbe, Martens, Olson & Bear, LLP

(57) ABSTRACT

Systems, methods and apparatuses implementing hybrid symmetric and asymmetric control for soft switching in wireless power transfer applications are provided. An apparatus for wirelessly transferring charging power is provided. The apparatus comprises a wireless power coupler. The apparatus comprises driver circuit. The apparatus comprises a control unit configured to instruct a driver circuit to drive the wireless power coupler with a first voltage waveform when transferring wireless charging power less than a first amount. The first voltage waveform includes a positive portion having a first duration and a negative portion having the first. The control unit is further configured to selectively instruct the driver circuit to drive the wireless power coupler with a second voltage waveform when transferring wireless charging power greater than the first amount, the second voltage waveform including a positive portion having a
(Continued)

second duration and a negative portion having a third duration that is not equal to the second duration.

21 Claims, 14 Drawing Sheets

(51) Int. Cl.
*H02J 50/12* (2016.01)
*H02J 50/80* (2016.01)
*B60L 53/12* (2019.01)
*H02M 1/00* (2006.01)

(52) U.S. Cl.
CPC ......... *H02M 3/337* (2013.01); *B60L 2210/30* (2013.01); *B60L 2210/40* (2013.01); *B60L 2270/147* (2013.01); *H02M 2001/0058* (2013.01); *Y02T 10/7005* (2013.01); *Y02T 10/7072* (2013.01); *Y02T 10/7241* (2013.01); *Y02T 10/92* (2013.01); *Y02T 90/122* (2013.01); *Y02T 90/127* (2013.01); *Y02T 90/14* (2013.01)

(56) References Cited

U.S. PATENT DOCUMENTS

| | | | |
|---|---|---|---|
| 8,731,116 | B2 | 5/2014 | Norconk et al. |
| 2012/0063184 | A1* | 3/2012 | Mazumder .......... H02M 7/4807 363/98 |
| 2013/0039099 | A1* | 2/2013 | Wu .................. H02M 7/53871 363/40 |
| 2013/0257311 | A1* | 10/2013 | Tran .................. H05B 33/0803 315/279 |
| 2014/0152250 | A1* | 6/2014 | Vijayan ............... H02M 3/3353 320/108 |
| 2015/0303703 | A1* | 10/2015 | Hayashi .................. H02J 5/005 307/104 |

OTHER PUBLICATIONS

Li H.L., "High Frequency Power Converters Based on Energy Injection Control for IPT Systems," Jan. 2011, 216 Pages.
Chudjuarjeen S., et al.,"An Improved $LLC$ Resonant Inverter for Induction-Heating Applications With Asymmetrical Control," IEEE Transactions on Industrial Electronics, IEEE Service Center, Piscataway, NJ, USA, vol. 58, (7), Jul. 7, 2011 (Jul. 7, 2011), pp. 2915-2925, XP011355877, ISSN: 0278-0046, DOI: 10. 1109/TIE.2010. 2070779.
International Search Report and Written Opinion—PCT/US2016/ 039861—ISA/EPO—Sep. 22, 2016.
Seung-Hee R., et al., "Analysis and Design of Modified Half-Bridge Series-Resonant Inverter With DC-Link Neutral-Point-Clamped Cell," IEEE Transactions on Power Electronics, Institute of Electrical and Electronics Engineers, USA, vol. 31(3), May 15, 2015 (May 15, 2015), pp. 2282-2295, XP011590474, ISSN: 0885-8993, DOI; 10,1109/TPEL.2015.2431376 [retrieved on Nov. 16, 2015].
Sharp B., et al., "Asymmetrical Voltage-Cancellation Control for LCL Resonant Converters in Inductive Power Transfer Systems," Applied Power Electronics Conference and Exposition (APEC), 2012 Twenty-Seventh Annual IEEE, IEEE, Feb. 5, 2012 (Feb. 5, 2012), pp. 661-666, XP032127739, DOI: 10.1109/APEC.2012. 6165889 ISBN: 978-1-4577-1215-9.

\* cited by examiner

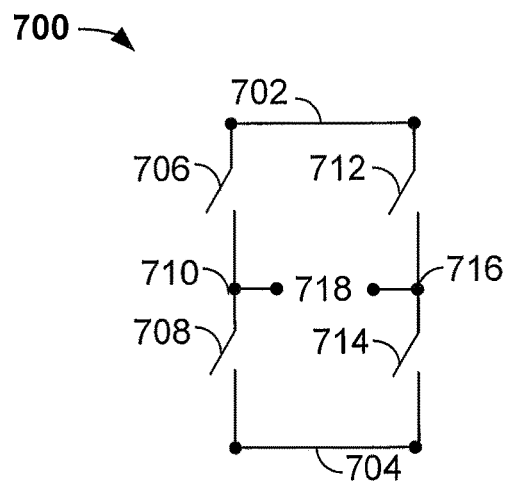
FIG. 7
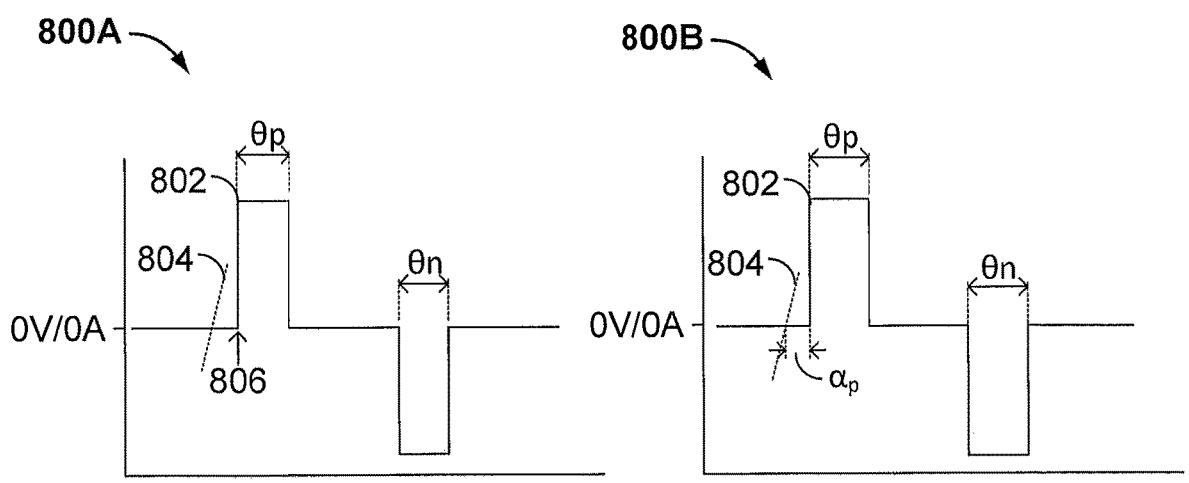
FIG. 8A
FIG. 8B

SYSTEMS, METHODS, AND APPARATUS IMPLEMENTING HYBRID SYMMETRIC AND ASYMMETRIC CONTROL FOR SOFT SWITCHING IN WIRELESS POWER TRANSFER APPLICATIONS

FIELD

The present disclosure relates generally to wireless power transfer, and more specifically to systems, methods and apparatuses implementing hybrid symmetric and asymmetric control for soft switching in wireless power transfer applications.

BACKGROUND

Inductive power transfer (IPT) systems provide one example of wireless transfer of energy. In IPT systems, a primary power device (or "transmitter") transmits power wirelessly to a secondary power device (or "receiver"). Each of the transmitter and receiver includes an inductive coupler, typically a single or multi-coil arrangement of windings comprising electric current conveying materials, such as Litz wire. An alternating current passing through a primary coupler produces an alternating magnetic field. When a secondary coupler is placed in proximity to the primary coupler, the alternating magnetic field induces an electromotive force (EMF) in the secondary coupler according to Faraday's law, thereby wirelessly transferring power to the receiver.

In order to operate with high efficiency, IPT systems should be capable of switching to a positive voltage phase or to a negative voltage phase when the driving alternating currents are as near as possible to a zero crossing point ("soft switching"). Under symmetric switching conditions, this may be the equivalent of the IPT system operating as near as possible to a unity power factor, where the current and voltage waveforms are substantially in phase with one another. However, because the inductance of the IPT transmitter may vary significantly depending on coupling with an IPT receiver, such unity power factor is not generally achievable utilizing symmetric duty cycle positive and negative voltage phases. This can result in switching between positive and negative voltage phases of the driving voltage waveform when the IPT driving current is at significant non-zero values ("hard switching"). This can cause excessive power dissipation in or failure of the IPT driver switches. As such, systems, methods and apparatuses implementing hybrid symmetric and asymmetric control for soft switching in wireless power transfer applications are desirable.

SUMMARY

Some implementations provide an apparatus for wirelessly transferring charging power. The apparatus comprises a wireless power coupler. The apparatus further comprises a driver circuit. The apparatus further comprises a controller configured to instruct the driver circuit to drive the wireless power coupler with a first voltage waveform when transferring wireless charging power less than a first amount, the first voltage waveform including a positive portion having a first duration and a negative portion having the first duration. The controller is further configured to selectively instruct the driver circuit to drive the wireless power coupler with a second voltage waveform when transferring wireless charging power greater than the first amount, the second voltage waveform including a positive portion having a second duration and a negative portion having a third duration that is not equal to the second duration.

Some other implementations provide a method for wirelessly transferring charging power. The method comprises driving a wireless power coupler with a first voltage waveform when transferring wireless charging power less than a first amount, the first voltage waveform including a positive portion having a first duration and a negative portion having the first duration. The method comprises selectively driving the wireless power coupler with a second voltage waveform when transferring wireless charging power greater than the first amount, the second voltage waveform including a positive portion having a second duration and a negative portion having a third duration that is not equal to the second duration.

Yet other implementations provide a non-transitory, computer-readable medium comprising code that, when executed, causes an apparatus for wirelessly transferring charging power to drive a wireless power coupler with a first voltage waveform when transferring wireless charging power less than a first amount, the first voltage waveform including a positive portion having a first duration and a negative portion having the first duration. The code, when executed, further causes the apparatus to selectively drive the wireless power coupler with a second voltage waveform when transferring wireless charging power greater than the first amount, the second voltage waveform including a positive portion having a second duration and a negative portion having a third duration that is not equal to the second duration.

Yet other implementations provide an apparatus for wirelessly transmitting charging power. The apparatus comprises means for wirelessly transmitting the charging power. The apparatus further comprises means for driving the means for wirelessly transmitting the charging power with a first voltage waveform when transferring wireless charging power less than a first amount, the first voltage waveform including a positive portion having a first duration and a negative portion having the first duration. The apparatus further comprises means for selectively driving the means for wirelessly transmitting the charging power with a second voltage waveform when transferring wireless charging power greater than the first amount, the second voltage waveform including a positive portion having a second duration and a negative portion having a third duration that is not equal to the second duration.

BRIEF DESCRIPTION OF THE DRAWINGS

FIG. 7 is a schematic diagram of a full bridge inverter for driving a wireless power transfer system, in accordance with some implementations.

FIGS. 8A-8E show output voltage and current waveforms associated with the inverter of FIG. 7 under control of a hybrid symmetrical and asymmetrical driving scheme, in accordance with some implementations.

DETAILED DESCRIPTION

The detailed description set forth below in connection with the appended drawings is intended as a description of some implementations and is not intended to represent the only implementations. The detailed description includes specific details for the purpose of providing a thorough understanding of the implementations. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 1:
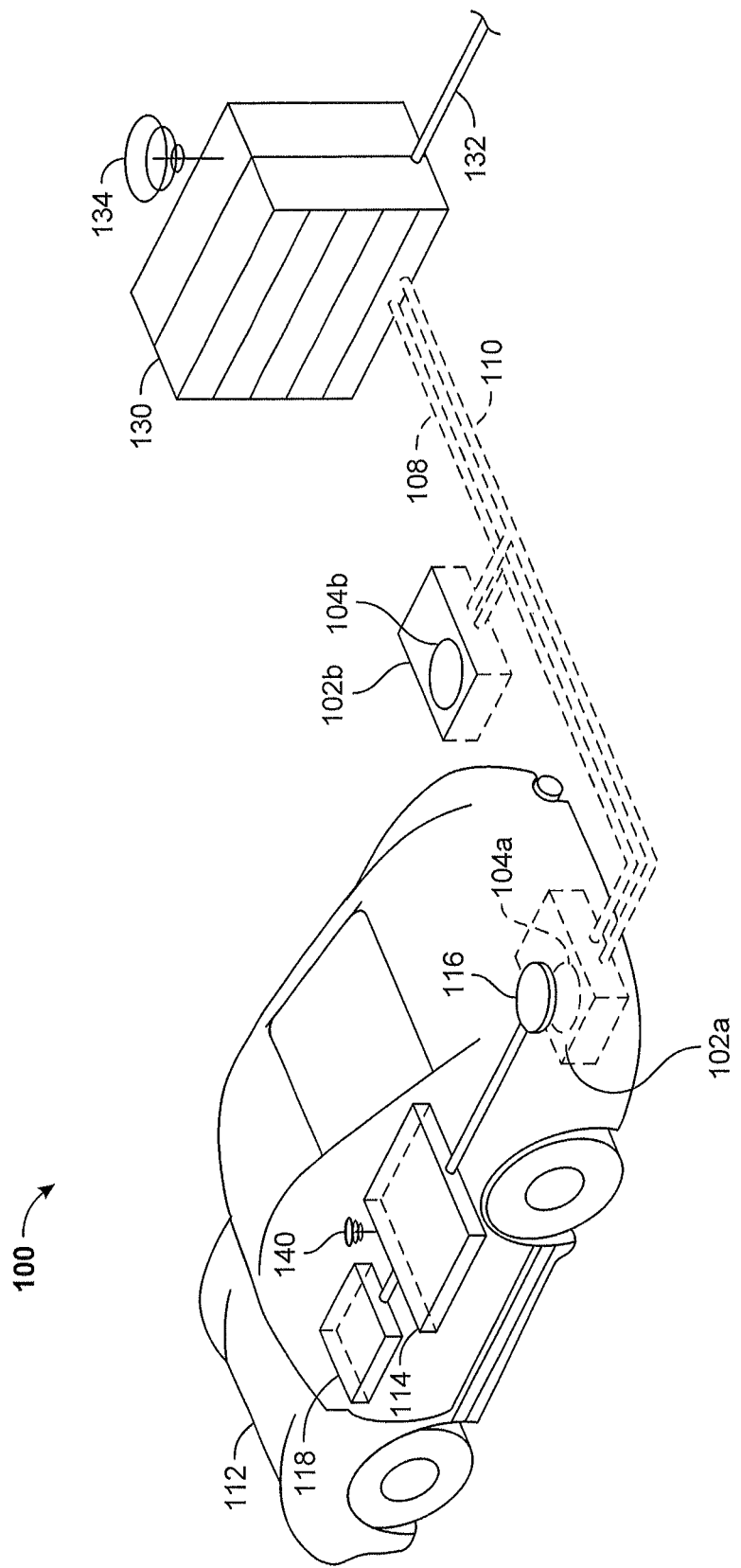
FIG. 1 illustrates a wireless power transfer system for charging an electric vehicle, in accordance with some implementations.

FIG. 1 is a diagram of a wireless power transfer system 100 for charging an electric vehicle, in accordance with some implementations. The wireless power transfer system 100 enables charging of an electric vehicle 112 while the electric vehicle 112 is parked so as to efficiently couple with a base wireless charging system 102a. Spaces for two electric vehicles are illustrated in a parking area to be parked over corresponding base wireless charging systems 102a and 102b. In some implementations, a local distribution center 130 may be connected to a power backbone 132 and configured to provide an alternating current (AC) or a direct current (DC) supply through a power link 110 to the base wireless charging systems 102a and 102b. Each of the base wireless charging systems 102a and 102b also includes a base coupler 104a and 104b, respectively, for wirelessly transferring power. In some other implementations (not shown in FIG. 1), base couplers 104a or 104b may be stand-alone physical units and are not part of the base wireless charging system 102a or 102b.

The electric vehicle 112 may include a battery unit 118, an electric vehicle coupler 116, and an electric vehicle wireless charging unit 114. The electric vehicle wireless charging unit 114 and the electric vehicle coupler 116 constitute the electric vehicle wireless charging system. In some diagrams shown herein, the electric vehicle wireless charging unit 114 is also referred to as the vehicle charging unit (VCU). The electric vehicle coupler 116 may interact with the base coupler 104a for example, via a region of the electromagnetic field generated by the base coupler 104a.

In some implementations, the electric vehicle coupler 116 may receive power when the electric vehicle coupler 116 is located in an electromagnetic field produced by the base coupler 104a, The field may correspond to a region where energy output by the base coupler 104a may be captured by the electric vehicle coupler 116. For example, the energy output by the base coupler 104a may be at a level sufficient to charge or power the electric vehicle 112. In some cases, the field may correspond to a "near-field" of the base coupler 104a. The near-field may correspond to a region in which there are strong reactive fields resulting from the currents and charges in the base coupler 104a that do not radiate power away from the base coupler 104a. In some cases the near-field may correspond to a region that is within about $1/2\pi$ of a wavelength of the a frequency of the electromagnetic field produced by the base coupler 104a distant from the base coupler 104a, as will be further described below.

Local distribution center 130 may be configured to communicate with external sources (e.g., a power grid) via a communication backhaul 134, and with the base wireless charging system 102a via a communication link 108.

In some implementations the electric vehicle coupler 116 may be aligned with the base coupler 104a and, therefore, disposed within a near-field region simply by the electric vehicle operator positioning the electric vehicle 112 such that the electric vehicle coupler 116 is sufficiently aligned relative to the base coupler 104a. Alignment may be considered sufficient when an alignment error has fallen below a tolerable value. In other implementations, the operator may be given visual and/or auditory feedback to determine when the electric vehicle 112 is properly placed within a tolerance area for wireless power transfer. In yet other implementations, the electric vehicle 112 may be positioned by an autopilot system, which may move the electric vehicle 112 until the sufficient alignment is achieved. This may be performed automatically and autonomously by the electric vehicle 112 with or without driver intervention. This may be possible for an electric vehicle 112 that is equipped with a servo steering, radar sensors (e.g., ultrasonic sensors), and intelligence for safely maneuvering and adjusting the electric vehicle. In still other implementations, the electric vehicle 112 and/or the base wireless charging system 102a may have functionality for mechanically displacing and moving the couplers 116 and 104a, respectively, relative to each other to more accurately orient or align them and develop sufficient and/or otherwise more efficient coupling there between.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention or manipulation thereby improving convenience to a user. There may also be no exposed electrical contacts and no mechanical wear out, thereby improving reliability of the wireless power transfer system 100. Safety may be improved since manipulations with cables and connectors may not be needed and there may be no cables, plugs, or sockets to be exposed to moisture in an outdoor environment. In addition, there may also be no visible or accessible sockets, cables, or plugs, thereby reducing potential vandalism of power charging devices. Further, since the electric vehicle 112 may be used as distributed storage devices to stabilize a power grid, a convenient docking-to-grid solution may help to increase availability of vehicles for vehicle-to-grid (V2G) operation.

The wireless power transfer system 100 as described with reference to FIG. 1 may also provide aesthetic and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that either the base wireless charging system 102a can transmit power to the electric vehicle 112 or the electric vehicle 112 can transmit power to the base wireless charging system 102a. This capability may be useful to stabilize the power distribution grid by allowing electric vehicles 112 to contribute power to the overall distribution system in times of energy shortfall caused by over demand or shortfall in renewable energy production (e.g., wind or solar).

Figure 2:
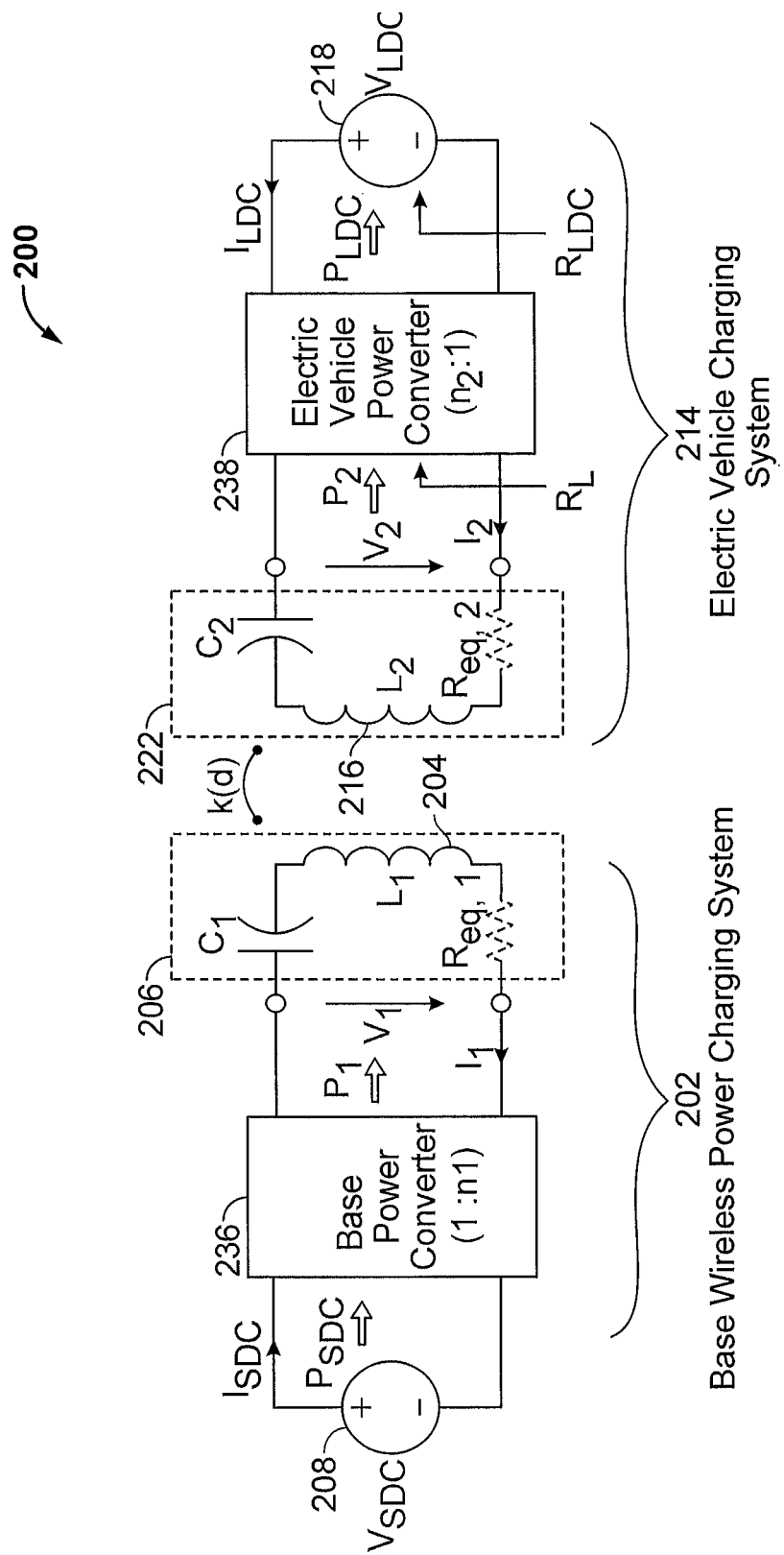
FIG. 2 is a schematic diagram of core components of a wireless power transfer system similar to that previously discussed in connection with FIG. 1, in accordance with some implementations.

FIG. 2 is a schematic diagram of core components of a wireless power transfer system 200 similar to that previously discussed in connection with FIG. 1, in accordance with some implementations. The wireless power transfer system 200 may include a base resonant circuit 206 including a base coupler 204 having an inductance $L_1$. The wireless power transfer system 200 further includes an electric vehicle resonant circuit 222 including an electric vehicle coupler 216 having an inductance $L_2$. Implementations described herein may use capacitively loaded conductor loops (i.e., multi-turn coils) forming a resonant structure that is capable of efficiently coupling energy from a primary structure (transmitter) to a secondary structure (receiver) via a magnetic or electromagnetic near-field if both the transmitter and the receiver are tuned to a common resonant frequency. The coils may be used for the electric vehicle coupler 216 and the base coupler 204. Using resonant structures for coupling energy may be referred to as "magnetically coupled resonance," "electromagnetically coupled resonance," and/or "resonant induction." The operation of the wireless power transfer system 200 will be described based on power, transfer from a base coupler 204 to an electric vehicle 112 (not shown), but is not limited thereto. For example, as discussed above, energy may be also transferred in the reverse direction.

With reference to FIG. 2, a power supply 208 (e.g., AC or DC) supplies power $P_{SDC}$ to the base power converter 236 as part of the base wireless power charging system 202 to transfer energy to an electric vehicle (e.g., electric vehicle 112 of FIG. 1). The base power converter 236 may include circuitry such as an AC-to-DC converter configured to convert power from standard mains AC to DC power at a suitable voltage level, and a DC-to-low frequency (LF) converter (e.g., an inverter) configured to convert DC power to power at an operating frequency suitable for wireless high power transfer. The base power converter 236 supplies power $P_1$ to the base resonant circuit 206 including tuning capacitor $C_1$ in series with base coupler 204 to emit an electromagnetic field at the operating frequency. The series-tuned resonant circuit 206 should be construed as only an example implementation. In another implementation, the capacitor $C_1$ may be coupled with the base coupler 204 in parallel. In yet other implementations, tuning may be formed of several reactive elements in any combination of parallel or series topology. The capacitor $C_1$ may be provided to form a resonant circuit with the base coupler 204 that resonates substantially at the operating frequency. The base coupler 204 receives the power $P_1$ and wirelessly transmits power at a level sufficient to charge or power the electric vehicle. For example, the level of power provided wirelessly by the base coupler 204 may be on the order of kilowatts (kW) (e.g., anywhere from 1 kW to 110 kW, although actual levels may be higher or lower).

The base resonant circuit 206 (including the base coupler 204 and tuning capacitor $C_1$) and the electric vehicle resonant circuit 222 (including the electric vehicle coupler 216 and tuning capacitor $C_2$) may be tuned to substantially the same frequency. The electric vehicle coupler 216 may be positioned within the near-field of the base coupler and vice versa, as further explained below. In this case, the base coupler 204 and the electric vehicle coupler 216 may become coupled to one another such that power may be transferred wirelessly from the base coupler 204 to the electric vehicle coupler 216. The series capacitor $C_2$ may be provided to form a resonant circuit with the electric vehicle coupler 216 that resonates substantially at the operating frequency. The series-tuned resonant circuit 222 should be construed as being only an example implementation. In another implementation, the capacitor $C_2$ may be coupled with the electric vehicle coupler 216 in parallel. In yet other implementations, the electric vehicle resonant circuit 222 may be formed of several reactive elements in any combination of parallel or series topology. Element k(d) represents the mutual coupling coefficient resulting at coil separation d. Equivalent resistances $R_{eq,1}$ and $R_{eq,2}$ represent the losses that may be inherent to the base and electric vehicle couplers 204 and 216 and the tuning (anti-reactance) capacitors $C_1$ and $C_2$, respectively. The electric vehicle resonant circuit 222, including the electric vehicle coupler 216 and capacitor $C_2$, receives and provides the power $P_2$ to an electric vehicle power converter 238 of an electric vehicle charging system 214.

The electric vehicle power converter 238 may include, among other things, a LF-to-DC converter configured to convert power at an operating frequency back to DC power at a voltage level of the load 218 that may represent the electric vehicle battery unit. The electric vehicle power converter 238 may provide the converted power $P_{LDC}$ to the load 218. The power supply 208, base power converter 236, and base coupler 204 may be stationary and located at a variety of locations as discussed above. The electric vehicle load 218 (e.g., the electric vehicle battery unit), electric vehicle power converter 238, and electric vehicle coupler 216 may be included in the electric vehicle charging system 214 that is part of the electric vehicle (e.g., electric vehicle 112) or part of its battery pack (not shown). The electric vehicle charging system 214 may also be configured to provide power wirelessly through the electric vehicle coupler 216 to the base wireless power charging system 202 to feed power back to the grid. Each of the electric vehicle coupler 216 and the base coupler 204 may act as transmit or receive couplers based on the mode of operation.

While not shown, the wireless power transfer system 200 may include a load disconnect unit (LDU) (not known) to safely disconnect the electric vehicle load 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

As described above, in operation, during energy transfer towards an electric vehicle (e.g., electric vehicle 112 of FIG. 1), input power is provided from the power supply 208 such that the base coupler 204 generates an electromagnetic field for providing the energy transfer. The electric vehicle coupler 216 couples to the electromagnetic field and generates output power for storage or consumption by the electric vehicle 112. As described above, in some implementations, the base resonant circuit 206 and electric vehicle resonant circuit 222 are configured and tuned according to a mutual resonant relationship such that they are resonating nearly or substantially at the operating frequency. Transmission losses between the base wireless power charging system 202 and electric vehicle charging system 214 are minimal when the electric vehicle coupler 216 is located in the near-field coupling mode region of the base coupler 204 as further explained below.

As stated, an efficient energy transfer occurs by transferring energy via a magnetic near-field rather than via electromagnetic waves in the far field, which may involve substantial losses due to radiation into space. When in the near-field, a coupling mode may be established between the transmit coupler and the receive coupler. The space around the couplers where this near-field coupling may occur is referred to herein as a near-field coupling mode region.

While not shown, the base power converter 236 and the electric vehicle power converter 238 if bidirectional may both include, for the transmit mode, an oscillator, a driver circuit such as a power amplifier, a filter and matching circuit, and for the receive mode a rectifier circuit. The oscillator may be configured to generate a desired operating frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance as presented by the resonant circuits 206 and 222 to the base and electric vehicle power converters 236 and 238, respectively. For the receive mode, the base and electric vehicle power converters 236 and 238 may also include a rectifier and switching circuitry.

The electric vehicle coupler 216 and base coupler 204 as described throughout the disclosed implementations may be referred to or configured as "conductor loops," and more specifically, "multi-turn conductor loops" or coils. The base and electric vehicle couplers 204 and 216 may also be referred to herein or be configured as "magnetic" couplers. The term "coupler" is intended to refer to a component that may wirelessly output or receive energy for coupling to another "coupler."

A resonant frequency may be based on the inductance and capacitance of a resonant circuit (e.g. resonant circuit 206) including a coupler (e.g., the base coupler 204 and capacitor $C_2$) as described above. As shown in FIG. 2, inductance may generally be the inductance of the coupler, whereas, capacitance may be added to the coupler to create a resonant structure at a desired resonant frequency. Accordingly, for larger size couplers using larger diameter coils exhibiting larger inductance, the value of capacitance needed to produce resonance may be lower. Inductance may also depend on a number of turns of a coil. Furthermore, as the size of the coupler increases, coupling efficiency may increase. This is mainly true if the size of both base and electric vehicle couplers increase. Furthermore a resonant circuit including a coupler and tuning capacitor may be designed to have a high quality (Q) factor to improve energy transfer efficiency. For example, the Q factor may be 300 or greater.

As described above, according to some implementations, coupling power between two couplers that are in the near-field of one another is disclosed. As described above, the near-field may correspond to a region around the coupler in which mainly reactive electromagnetic fields exist. If the physical size of the coupler is much smaller than the wavelength, inversely proportional to the frequency, there is no substantial loss of power due to waves propagating or radiating away from the coupler. Near-field coupling-mode regions may correspond to a volume that is near the physical volume of the coupler, typically within a small fraction of the wavelength. According to some implementations, magnetic couplers, such as single and multi-turn conductor loops, are preferably used for both transmitting and receiving since handling magnetic fields in practice is easier than electric fields because there is less interaction with foreign objects, e.g., dielectric objects and the human body. Nevertheless, "electric" couplers (e.g., dipoles and monopoles) or a combination of magnetic and electric couplers may be used.

Figure 3:
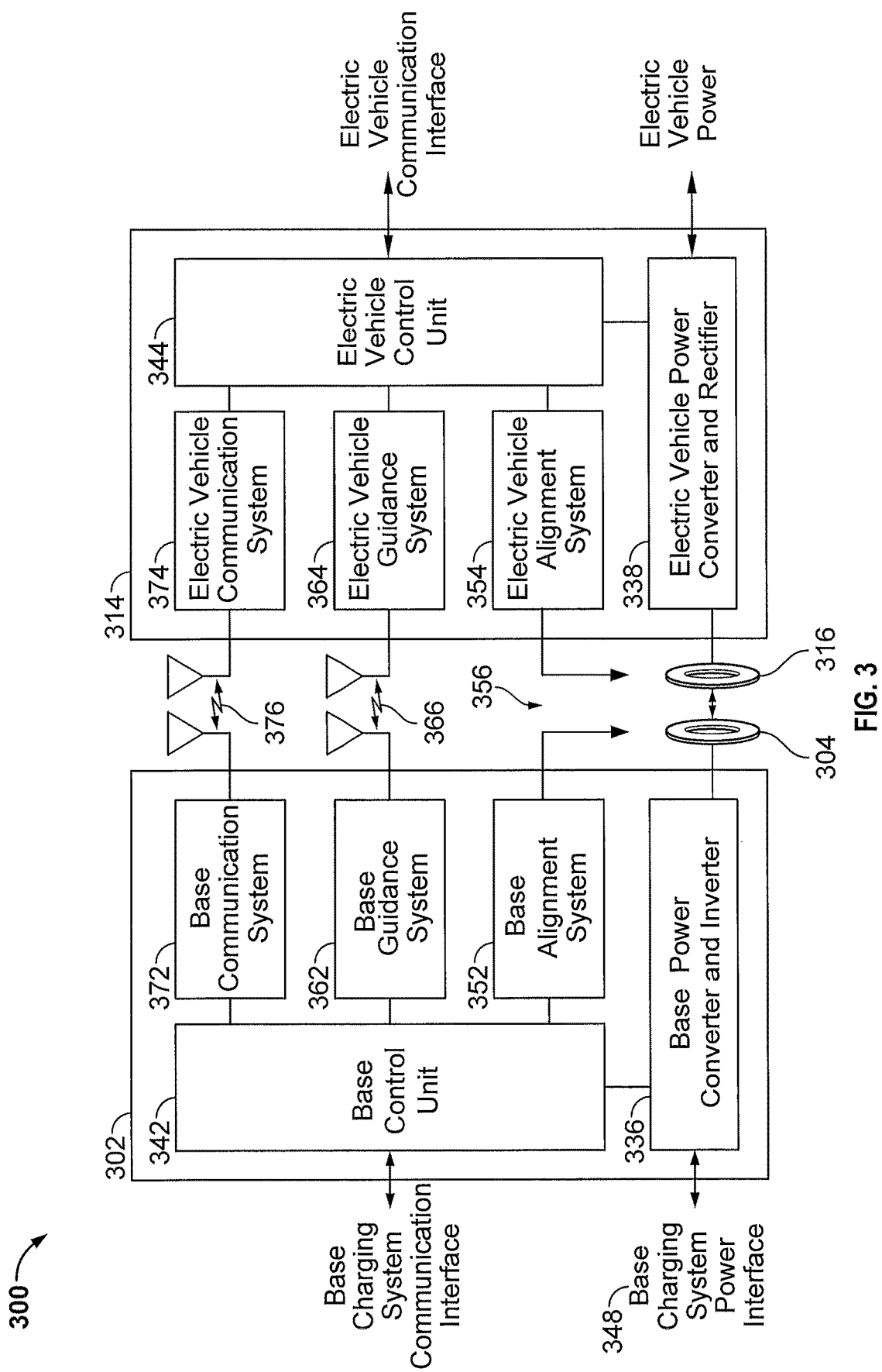
FIG. 3 is a functional block diagram showing core and ancillary components of the wireless power transfer system of FIG. 1.

FIG. 3 is a functional block diagram showing components of wireless power transfer system 300, which may be employed in wireless power transfer system 100 of FIG. 1 and/or that wireless power transfer system 200 of FIG. 2 may be part of. The wireless power transfer system 300 illustrates a communication link 376, a guidance link 366, using, for example, a magnetic field signal for determining a position or direction, and an alignment mechanism 356 capable of mechanically moving one or both of the base coupler 304 and the electric vehicle coupler 316. Mechanical (kinematic) alignment of the base coupler 304 and the electric vehicle coupler 316 may be controlled by the base alignment system 352 and the electric vehicle charging alignment system 354, respectively. The guidance link 366 may be capable of bi-directional signaling, meaning that guidance signals may be emitted by the base guidance system or the electric vehicle guidance system or by both. As described above with reference to FIG. 1, when energy flows towards the electric vehicle 112, in FIG. 3 a base charging system power interface 348 may be configured to provide power to a base power converter and inverter 336 from a power source, such as an AC or DC power supply (not shown). The base power converter and inverter 336 may receive AC or DC power via the base charging system power interface 348 to drive the base coupler 304 at a frequency near or at the resonant frequency of the base resonant circuit 206 with reference to FIG. 2. The electric vehicle coupler 316, when in the near-field coupling-mode region, may receive energy from the electromagnetic field to oscillate at or near the resonant frequency of the electric vehicle resonant circuit 222 with reference to FIG. 2, The electric vehicle power converter 338 converts the oscillating signal from the electric vehicle coupler 316 to a power signal suitable for charging a battery via the electric vehicle power interface.

The base wireless charging system 302 includes a base control unit 342 and the electric vehicle charging system 314 includes an electric vehicle control unit 344. The base control unit 342 may provide a base charging system communication interface to other systems (not shown) such as, for example, a computer, a base common communication (BCC), a communications entity of the power distribution center, or a communications entity of a smart power grid. The electric vehicle control unit 344 may provide an electric vehicle communication interface to other systems (not shown) such as, for example, an on-board computer on the vehicle, a battery management system, other systems within the vehicles, and remote systems.

The base communication system 372 and electric vehicle communication system 374 may include subsystems or modules for specific application with separate communication channels and also for wirelessly communicating with other communications entities not shown in the diagram of FIG. 3. These communications channels may be separate physical channels or separate logical channels. As non-limiting examples, a base alignment system 352 may communicate with an electric vehicle alignment system 354 through communication link 376 to provide a feedback mechanism for more closely aligning the base coupler 304 and the electric vehicle coupler 316, for example via autonomous mechanical (kinematic) alignment, by either the electric vehicle alignment system 352 or the base alignment system 302, or by both, or with operator assistance as described herein. Similarly, a base guidance system 362 may communicate with an electric vehicle guidance system 364 through communication link 376 and also using a guidance link 366 for determining a position or direction as needed to guide an operator to the charging spot and in aligning the base coupler 304 and electric vehicle coupler 316. In some implementations, communications link 376 may comprise a plurality of separate, general-purpose communication channels supported by base communication system 372 and electric vehicle communication system 374 for communicating other information between the base wireless charging system 302 and the electric vehicle charging system 314. This information may include information about electric vehicle characteristics, battery characteristics, charging status, and power capabilities of both the base wireless charging system 302 and the electric vehicle charging system 314, as well as maintenance and diagnostic data for the electric vehicle. These communication channels may be separate logical channels or separate physical communication channels such as, for example, WLAN, Bluetooth, zigbee, cellular, etc.

In some implementations, the electric vehicle control unit 344 may also include a battery management system (BMS) (not shown) that manages charge and discharge of the electric vehicle principal and/or auxiliary battery. As discussed herein, base guidance system 362 and electric vehicle guidance system 364 include the functions and sensors as needed for determining a position or direction, e.g., based on microwave, ultrasonic radar, or magnetic vectoring principles. Further, electric vehicle control unit 344 may be configured to communicate with electric vehicle onboard systems. For example, electric vehicle control unit 344 may provide, via the electric vehicle communication interface, position data, e.g., for a brake system configured to perform a semi-automatic parking operation, or for a steering servo system configured to assist with a largely automated parking ("park by wire") that may provide more convenience and/or higher parking accuracy as may be needed in certain applications to provide sufficient alignment between base and electric vehicle couplers 304 and 316. Moreover, electric vehicle control unit 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

The wireless power transfer system 300 may include other ancillary systems such as detection and sensor systems (not shown). For example, the wireless power transfer system 300 may include sensors for use with systems to determine a position as required by the guidance system (362, 364) to properly guide the driver or the vehicle to the charging spot, sensors to mutually align the couplers with the required separation/coupling, sensors to detect objects that may obstruct the electric vehicle coupler 316 from moving to a particular height and/or position to achieve coupling, and safety sensors for use with systems to perform a reliable, damage free, and safe operation of the system. For example, a safety sensor may include a sensor for detection of presence of animals or children approaching the base and electric vehicle couplers 304, 316 beyond a safety radius, detection of metal objects located near or in proximity of the base or electric vehicle coupler (304, 316) that may be heated up (induction heating), and for detection of hazardous events such as incandescent objects near the base or electric vehicle coupler (304, 316).

The wireless power transfer system 300 may also support plug-in charging via a wired connection, for example, by providing a wired charge port (not shown) at the electric vehicle charging system 314. The electric vehicle charging system 314 may integrate the outputs of the two different chargers prior to transferring power to or from the electric vehicle. Switching circuits may provide the functionality as needed to support both wireless charging and charging via a wired charge port.

To communicate between the base wireless charging system 302 and the electric vehicle charging system 314, the wireless power transfer system 300 may use in-band signaling via base and electric vehicle couplers 304, 316 and/or out-of-band signaling via communications systems (372, 374), e.g., via an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

Some communications (e.g., in-band signaling) may be performed via the wireless power link without using specific communications antennas. For example, the base and electric vehicle couplers 304 and 316 may also be configured to act as wireless communication antennas. Thus, some implementations of the base wireless charging system 302 may include a control unit (not shown) for enabling keying type protocol on the wireless power path. By keying the transmit power level (amplitude shift keying) at predefined intervals with a predefined protocol, the receiver may detect a serial communication from the transmitter. The base power converter 336 may include a load sensing circuit (not shown) for detecting the presence or absence of active electric vehicle power receivers in the near-field coupling mode region of the base coupler 304. By way of example, a load sensing circuit monitors the current flowing to a power amplifier of the base power converter 336, which is affected by the presence or absence of active power receivers in the near-field coupling mode region of the base coupler 304. Detection of changes to the loading on the power amplifier may be monitored by the base control unit 342 for use in determining whether to enable the base wireless charging system 302 for transmitting energy, to communicate with a receiver, or a combination thereof.

Figure 4:
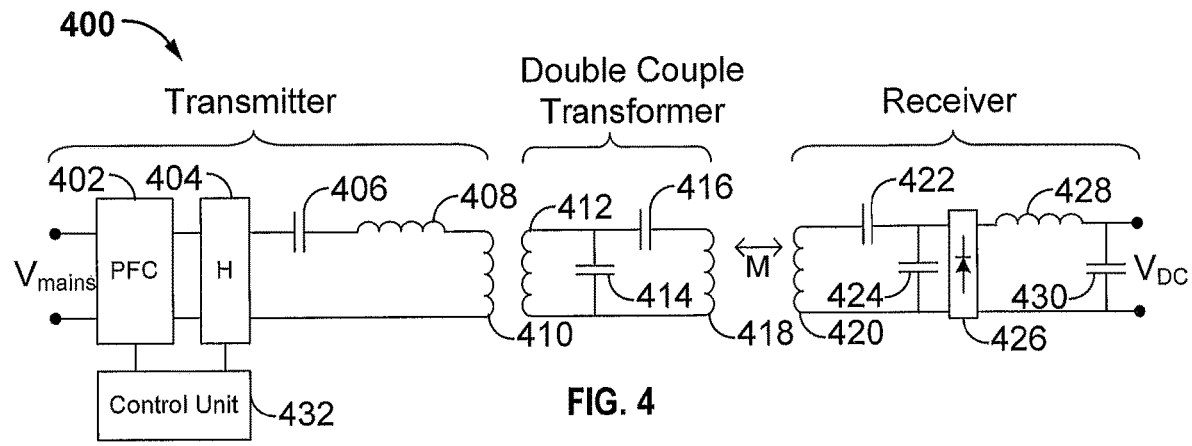
FIG. 4 is a functional block diagram showing an LCL parallel topology for a wireless power transfer system, in accordance with some implementations.

FIG. 4 is a functional block diagram showing an LCL parallel-tuned resonator topology for a wireless power transfer system 400, in accordance with some implementations. The system 400 may include an input filter or power factor converter (PFC) 402 and an inverter 404, which may collectively receive a mains voltage $V_{mains}$ and output a filtered and transformed voltage to a resonant circuit comprising a capacitor 406 in series with an inductor 408, which itself may be in series with a first coupler 410. In some implementations, the first coupler 410 may be an inductor. In some other implementations, both the inductor 408 and the first coupler 410 may be merged into a single component, for example the first coupler 410. The inverter 404 may be configured to drive the above-described resonant circuit with the transformed voltage to produce an alternating current that circulates in the resonant circuit, producing an electromagnetic field, from which a double couple transformer may draw power wirelessly. The inverter 404 may also be known as or called a "driver circuit." The inverter 404 and/or the PFC 402 may be instructed or controlled by one or more signals from a control unit 432, as will be described in more detail in connection with FIGS. 5-16.

The double couple transformer may include a second coupler 412, which in some implementations may be an inductor, connected in parallel with a capacitor 414 and connected in series with a capacitor 416 and a third coupler 418, which in some implementations may also be an inductor. In some implementations, the double couple transformer portion of the system 400 may be considered an extension of or a part of the transmitter. The double couple transformer has two (double) electromagnetic couplings, one between the first coupler 410 and the second coupler 412, and another between the third coupler 418 and a fourth coupler 420 of a wireless power receiver. The double coupler may receive wireless power via the second coupler 412 from the first coupler 410 and provides the wireless power to the fourth coupler 420 via the third coupler 418.

Figure 5:
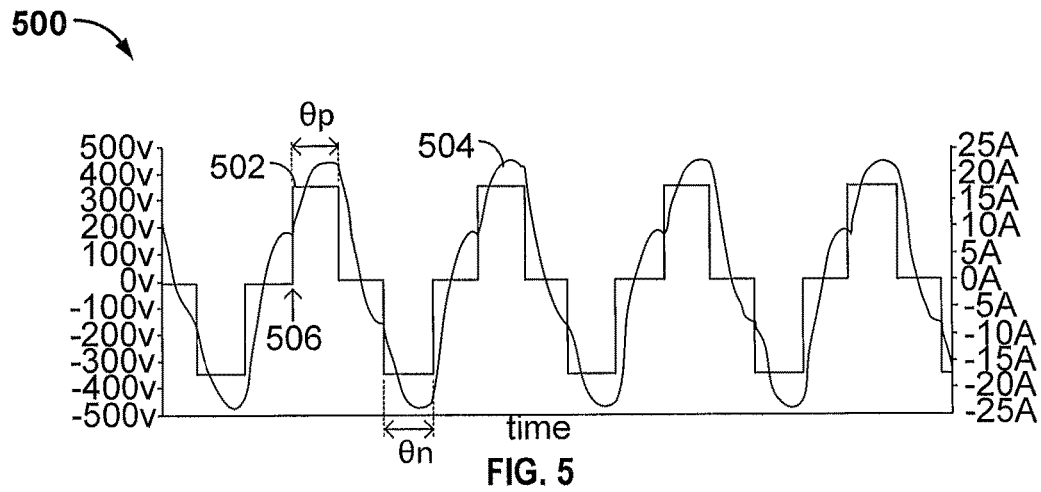
FIG. 5 is a graph showing output voltage and current waveforms for a wireless power transfer system operating under a symmetric driving scheme with hard switching, in accordance with some implementations.

The receiver may comprise the fourth coupler 420 connected in series with a capacitor 422. The capacitor 422 may be connected to a rectifier 426, which may be connected in parallel with a capacitor 424. The fourth coupler 420 may have a mutual coupling "M" with the third coupler 418, and may be configured to receive the wireless power from the third coupler 418 of the double couple transformer. The rectifier 426 may be configured to rectify the induced alternating voltage into a DC voltage and output the DC voltage to an inductor 428 connected in parallel with a capacitor 420. The inductor 428 and the capacitor 420 may function as a smoothing filter to smooth out the rectified DC voltage $V_{DC}$. Like every IPT system, it is not always possible to maintain a perfect resonance at a desired frequency (e.g., 85 kHz) since the capacitance of the capacitors 406, 414, 416, 422, 424 and 430 are generally fixed and the inductance of the first through fourth couplers 410, 412, 418 and 420 may vary (by e.g., as much as 10%) based on their physical alignment with one another. For this reason, it may not be possible to achieve 100% soft switching in the inverter 404 at all times utilizing only a symmetrical switching or driving scheme. For example, where the inductances of the couplers 410, 412, 418 and 420 are either above or below their nominal values, the inverter 404 will be presented with an inductive or capacitive load. If the inverter 404 is presented with a capacitive load, or at low conduction angles too low of an inductive load, the inverter 404 will be forced to operate under "hard switching" conditions, which cause heating within and possibly failure of the switches in the inverter 404. FIG. 5 shows the relationship between the current and voltage waveforms at the output of the inverter 404 during such "hard switching."

FIG. 5 is a graph 500 showing output voltage and current waveforms for a wireless power transfer system operating under a symmetric driving scheme with hard switching, in accordance with some implementations. For the graph 500, the left vertical axis corresponds to a voltage level, the right vertical axis corresponds to a current level and the horizontal axis corresponds to the passage of time. The graph 500 shows a voltage waveform 502 and a current waveform 504 for an inverter, for example, the inverter 404 of FIG. 4. The current waveform 502 is produced by the voltage waveform 502 being impressed on a load (e.g., output impedance) presented to the inverter. Where the output impedance is capacitive (e.g., the reactance due to all capacitive elements within the load exceeds the reactance due to all inductive elements within the load), as shown here, the current waveform 502 will lead the voltage waveform 504 (e.g., the current waveform 504 will rise above zero current before the voltage waveform 502 rises above zero voltage). The condition of "hard switching" occurs when the current waveform 504 has a non-zero, positive value at a rising edge 506 of the voltage waveform 502. Because power is voltage× current, at the rising edge 506, the non-zero positive current times the non-zero positive voltage causes proportional power dissipation in the switch during switching. Thus, hard switching occurs when a positive current circulates in a wireless power coupler at a rising edge of the positive portion of the driving voltage waveform 502. This power is dissipated as heat in the switch, which if extreme enough can damage or destroy the switches in the inverter. In graph 500 the voltage waveform 502 is a symmetrical waveform in that the conducting angle $\theta_p$ (e.g., the duty cycle of the positive portion of the waveform) is the same as the common conduction angle $\theta_n$ (e.g., the duty cycle of the negative portion of the waveform).

Figure 6:
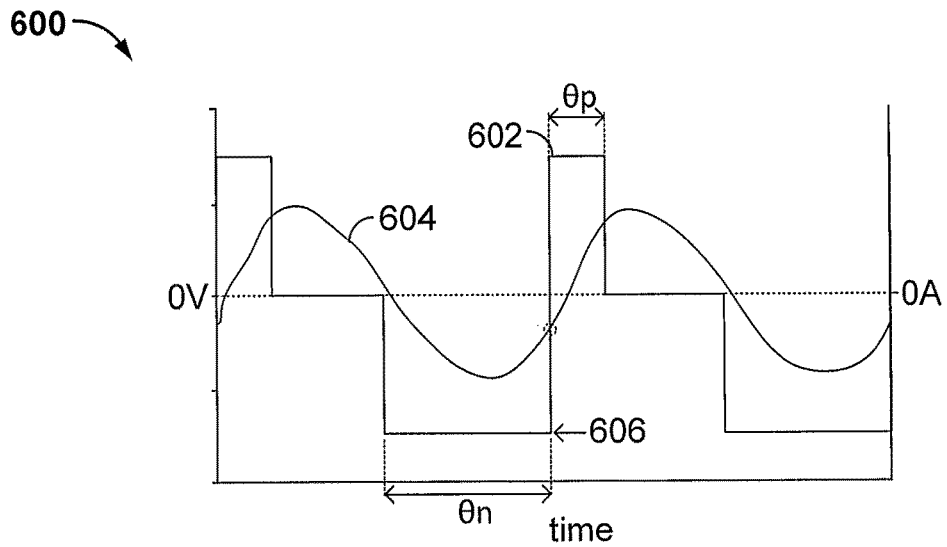
FIG. 6 is a graph showing output voltage and current waveforms for a wireless power transfer system operating under an asymmetric driving scheme with soft switching, in accordance with some implementations.

FIG. 6 is a graph 600 showing output voltage and current waveforms for a wireless power transfer system operating under an asymmetric driving scheme with soft switching, in accordance with some implementations. For the graph 600, the left vertical axis corresponds to a voltage level, the right vertical axis corresponds to a current level and the horizontal axis corresponds to the passage of time. The graph 600 shows a voltage waveform 602 and a current waveform 604 for an inverter, for example, the inverter 404 of FIG. 4. For the purposes of illustration in FIG. 6, only the relative values of the voltage waveform 602 and the current waveform 604 with respect to a 0 volt and a 0 amp position are shown. The condition of "soft switching" occurs when the current waveform 604 is substantially at or below zero at a rising edge 606 of the voltage waveform 602. As previously described, since the instantaneous power dissipation at any point in time is the current×the voltage at any instant, the power dissipation during switching will be substantially zero if the current waveform 604 has a substantially zero or below zero value at the rising edge 606 of the voltage waveform 602. In graph 600 the voltage waveform 602 is an asymmetrical waveform in that the conducting angle $\theta_p$ (e.g., the duty cycle of the positive portion of the waveform) is different from the common conduction angle $\theta_n$ (e.g., the duty cycle of the negative portion of the waveform).

Table 1 below shows the efficiency ($\eta$) of an IPT system while utilizing either a first pattern (i.e., pattern 1, analogous to the symmetrical driving pattern shown in FIG. 5) or a second pattern (i.e., pattern 2, analogous to the asymmetrical driving pattern shown in FIG. 6) for each of a plurality of x-offsets, y-offsets, and z-offsets of the IPT transmitter with respect to an IPT receiver, and for each of a plurality of output voltages of the wireless IPT inverter. Table 1 also shows whether pattern 1 (symmetrical driving scheme) or pattern 2 (asymmetrical driving scheme) would operate under soft switching ("S") or hard switching ("H") conditions in each of the different offset and output voltage conditions.

TABLE 1

| X (mm) | Y (mm) | zCoil (VP) to P (mm) | V_out (V) | $\eta$ (Sym) | Switching (H or S) | $\eta$ (Asym) | Switching (H or S) | $\eta\Delta$ | $\eta$ mixed |
|---|---|---|---|---|---|---|---|---|---|
| 0 | 0 | 68.0 | 400.0 | 88.1 | H | 90.1 | S | 2.0 | 90.1 |
| 0 | 150 | | | 91 | S | 90.5 | S | −0.5 | 91 |
| 75 | 100 | | | 91.2 | S | 90.6 | S | −0.6 | 91.2 |
| 100 | 150 | | | 90.7 | S | 90.4 | S | −0.3 | 90.7 |
| 100 | 0 | | | 91.45 | S | 90.7 | S | −0.8 | 91.45 |
| 75 | 0 | | | 91.15 | S | 90.7 | S | −0.5 | 91.15 |
| 0 | 0 | | 270.0 | 92.4 | H | 93.0 | S | 0.6 | 93.0 |
| 0 | 150 | | | 93.5 | S | 92.9 | S | −0.6 | 93.5 |
| 75 | 100 | | | 93.3 | S | 92.9 | S | −0.4 | 93.3 |
| 100 | 150 | | | 91 | S | 91.0 | S | 0.0 | 91 |
| 100 | 0 | | | 92.45 | S | 92.4 | S | 0.0 | 92.45 |
| 75 | 0 | | | 93.4 | S | 92.9 | S | −0.5 | 93.4 |
| 0 | 0 | 103.0 | 400.0 | 89 | H | 91.7 | S | 2.7 | 91.7 |
| 0 | 150 | | | 91.5 | H/S | 91.6 | S | 0.1 | 91.6 |
| 75 | 100 | | | 91.7 | H/S | 91.5 | S | −0.2 | 91.5 |
| 100 | 150 | | | 91 | S | 90.9 | S | −0.1 | 91 |
| 100 | 0 | | | 91.8 | S | 91.6 | S | −0.2 | 91.8 |
| 75 | 0 | | | 91.5 | H/S | 91.5 | S | 0.0 | 91.5 |
| 0 | 0 | | 270.0 | 92.7 | H | 93.2 | S | 0.5 | 93.2 |
| 0 | 150 | | | 92.6 | H | 93.1 | S | 0.3 | 93.1 |
| 75 | 100 | | | 92.5 | H/S | 92.6 | S | 0.1 | 92.6 |
| 100 | 150 | | | 90.5 | S | 90.6 | S | 0.1 | 90.5 |
| 100 | 0 | | | 91.6 | S | 91.8 | S | 0.2 | 91.6 |
| 75 | 0 | | | 92.6 | H | 93.0 | S | 0.4 | 93.0 |

As shown in Table 1, the pattern 1 (symmetrical driving scheme) results in a higher IPT system efficiency for all x-, y-, and z-offsets for which soft switching occurs and the pattern 2 (asymmetrical driving scheme) results in higher IPT system efficiency in the conditions where the symmetrical driving scheme would operate under hard switching conditions. In fact, at the lowest efficiency for pattern 1 switching (e.g., at 0 mm x- and y-offset, 103 mm z-offset and 400V inverter output voltage) the asymmetric driving scheme, operating under soft switching, is as much as, for example, 2.7% more efficient than operating according to the symmetric driving scheme under hard switching conditions. Accordingly, operating according to a hybrid control scheme where symmetric switching is utilized for ramp up and ramp down between zero power output and some predetermined percentage of nominal power (e.g., 20%) and then switching to an asymmetrical driving scheme in order to achieve soft switching above the predetermined percentage of nominal power would not only improve IPT system operating efficiency, but also protect the switching components of the IPT system from damage and/or destruction due to hard switching.

FIG. 7 is a schematic diagram of a full bridge inverter 700 for driving a wireless power transfer system, in accordance with some implementations. In some implementations, the inverter 700 may also be called a "driver circuit" and may comprise the power converter 236 of FIG. 2, the power converter and inverter 336 of FIG. 3, and/or the inverter 404 of FIG. 4. As shown, the full bridge inverter 700 comprises a positive voltage rail 702, a negative voltage rail 704, and a first switch 706 connected in series with a second switch 708 at a first node 710. The first 706 and second 708 switches are connected between the positive voltage rail 702 and the negative voltage rail 704. The first switch 706 and the second switch 708 form a first leg of the inverter 700. The inverter 700 additionally includes a second leg comprising a third switch 712 connected in series with a fourth switch 714 at a second node 716. The third 712 and fourth 714 switches are connected between the positive voltage rail 702 and the negative voltage rail 704. The output 718 of the inverter 700 may comprise a first terminal at the first node 710 and a second terminal at the second node 716. As the first 706 and second 708 switches periodically switch connection of the first node 710 between the positive voltage rail 702 and the negative voltage rail 706, respectively, the third 712 and fourth 714 switches periodically switch connection of the second node 716 between the positive voltage rail 702 and the negative voltage rail 704, respectively. The difference between the voltage at the first node 710 and the voltage at the second node 716 at any given time is the output voltage of the inverter 700.

FIG. 8A shows a graph 800A of output voltage 802 and current 804 waveforms associated with the inverter 700 of FIG. 7 under control of a symmetrical driving scheme, in accordance with some implementations. The vertical axis represents voltage and current levels, while the horizontal axis represents passage of time. The positive net conduction angle $\theta_p$ is the same as the negative net conduction angle $\theta_n$ and that conduction angle common to each of the positive portion and the negative portion is relatively small. In other words, with the voltage 802 and current 804 waveforms shown, the inverter 700 would be putting out a very low level of power relative to its nominal output capability, for example, during a ramp up or ramp down of wireless power transfer at a very low or zero value. As shown, the current waveform 804 leads the voltage waveform 802 such that the current will be substantially positive at the rising edge 806 of the voltage waveform 802. Although this leading current waveform 804 indicates "hard switching" within the inverter 700, the amount of power dissipated in the switches 706, 708, 712 and 714 is very low due to small currents at the time of switching, which in some cases occurs at the very small net conduction angles $\theta_p$ and $\theta_n$. Thus, this symmetrical switching pattern may be utilized until wireless power transfer or output reaches some predetermined percentage of a nominal power output, for example, 20% or until one or both of the conduction angles $\theta_p$ and $\theta_n$ reach a certain level, e.g., satisfy certain criteria. This allows a soft ramp up and soft ramp down of wireless power transfer or output in conditions where efficient soft switching may not be possible, and/or where asymmetrical switching would be less efficient.

FIG. 8B shows a graph 800B of the output voltage 802 and current 804 waveforms associated with the inverter 700 of FIG. 7 under control of an asymmetrical driving scheme, in accordance with some implementations. The vertical axis represents voltage and current levels, while the horizontal axis represents passage of time. The graph 800 shows the voltage waveform 802 and a portion of the associated current waveform 804 when the inverter 700 has just switched to an asymmetrical driving scheme, similar to that previously described in connection with FIG. 6. As compared to FIG. 8A, the positive $\theta_p$ and negative $\theta_n$ net conduction angles have increased such that wireless power transfer or output has increased just beyond the previously-described predetermined percentage. In addition, since no adjustments aside from those of $\theta_p$ and $\theta_n$ have yet been made, the net conduction angles $\theta_p$ and $\theta_n$ are still substantially the same as one another. The current waveform 804 leads the voltage waveform 802 by a switching angle of $\alpha_p$ at the rising edge of the positive portion of the voltage waveform 802. A switching angle of $\alpha_n$ at the falling edge of the negative portion of the voltage waveform 802 is not shown but may be substantially the same as $\alpha_p$. Going forward, the term switching angle may be taken to mean a phase angle between the zero crossing of the current waveform and the zero crossing of the voltage waveform.

Figure 8C:
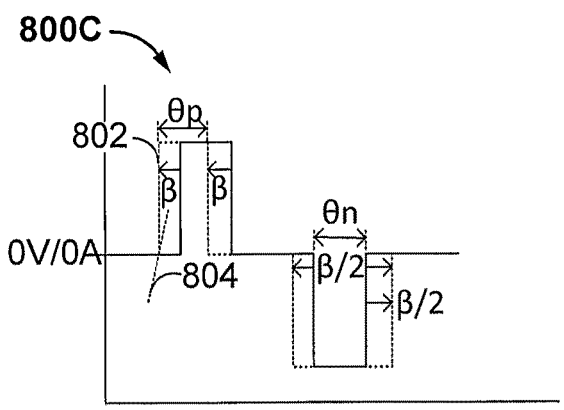

Since hard switching when the currents are higher at switching, and which in some cases occur at higher conduction angles θp and θn, causes undesired and potentially damaging power dissipation in the switches of the inverter 700, a control mechanism may measure the switching angle αp and begin to shift the positive portion of the voltage waveform 802 to the left (advance the timing of the rising and falling edges of the positive portion of the voltage waveform 802 equally) by a shifting angle β, as well as shift both the falling and rising edges of the negative portion of the voltage waveform 802 in opposite directions by the shifting angle β (advance the timing of the falling edge and retard the timing of the rising edge) in order to align the zero crossing points at each of the rising edge 806 of the positive portion and the falling edge of the negative portion of the voltage waveform 802, as will be shown in more detail in connection with FIG. 8C. This will result in an asymmetrical drive scheme in that the positive net conducting angle θp will no longer be equal to the negative net conducting angle θn, However, since the zero crossings for the voltage 802 and the current 804 waveforms coincide at the rising edge 806 of the positive portion and/or the falling edge of the negative portion of the voltage waveform 802, the switches within the inverter 700 will operate under soft switching conditions rather than hard switching conditions and the unwanted power dissipation associated with hard switching at larger conduction angles will not occur.

FIG. 8C shows a graph 800C of the output voltage and current waveforms associated with the inverter 700 of FIG. 7 under control of an asymmetrical driving scheme, in accordance with some implementations. The vertical axis represents voltage and current levels, while the horizontal axis represents passage of time. The graph 800C may be a continuation of the graph 800B of FIG. 8B. Graph 800C shows the voltage waveform 802 and the current waveform

804. The positive portion of the voltage waveform 802 is shifted by a shifting angle β in order to line up the rising edge of the positive portion of the voltage waveform 802 with the zero crossing of the current waveform 804. Since the rising edge and the falling edge of the positive portion of the voltage waveform 802 are both shifted to the left by the shifting angle β, the positive net conduction angle $\theta_p$ does not change from that shown in FIG. 8B. In some other implementations, the rising edge and the falling edge of the positive portion of the voltage waveform 804 may be shifted to the left by different amounts such that the conduction angle $\theta_p$ decreases. In such implementations, if the conduction angle $\theta_p$ decreases as much as the conduction angle $\theta_n$ increases (see below), the power transfer would remain constant. However, the falling edge of the negative portion of the voltage waveform 802 may also be shifted to the left by the shifting angle β/2, while the rising edge of the negative portion of the voltage waveform 802 may be shifted to the right by the shifting angle β/2. This may allow for an increasing average duty cycle of the voltage waveform 802 (and so the amount of wireless power transferred), while simultaneously aligning the falling edge of the negative portion of the voltage waveform 802 with the zero crossing of the current waveform 804 (see FIG. 8D). Thus, the negative conducting angle $\theta_n$ may increase by β. At this point, the voltage waveform 802 is under the control of an asymmetrical driving scheme.

Figure 8D:
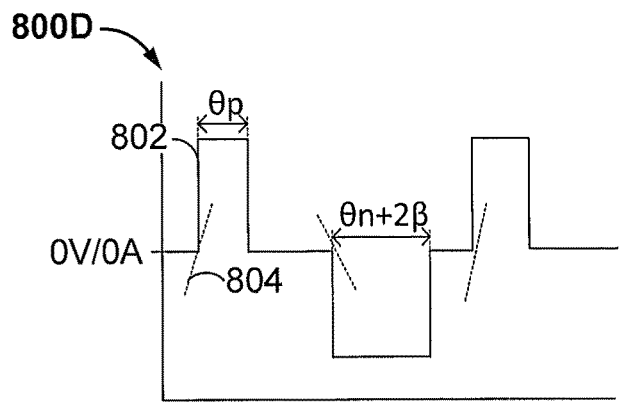

FIG. 8D shows a graph 800D of the output voltage 802 and current 804 waveforms associated with the inverter 700 of FIG. 7 under control of an asymmetrical driving scheme, in accordance with some implementations. The vertical axis represents voltage and current levels, while the horizontal axis represents passage of time. The graph 800D shows the voltage waveform 802 and the current waveform 804 after applying the shifting angle β as previously described in connection with FIG. 8C. The positive net conduction angle still has the same length $\theta_p$ as in each of FIGS. 8B and 8C, while the negative net conduction angle has a new length of $\theta_n+\beta$. As shown, the voltage waveform 802 and the current waveform 804 are now aligned such that the rising edges of the positive portions and the falling edges of the negative portions of the voltage waveform 802 coincide with the contemporaneous zero crossings of the current waveform 804. For the purposes of the discussion of FIGS. 8A-8E, it should be understood that the total time the voltage waveform 802 is positive or negative is a combination of the respective common conduction angle θ and the effect of the shifting angle β on that conducting angle. This is so because, in some implementations, the common conduction angles $\theta_p$ and $\theta_n$ may be controlled separately from the shifting angle β. Thus, control units of the common conduction angles $\theta_p$ and $\theta_n$ may work in concert with control units of the shifting angle β to achieve the appropriate total durations of conduction (e.g., net conduction angles) in each of the positive and negative portions of the voltage waveform 802.

Figure 8E:
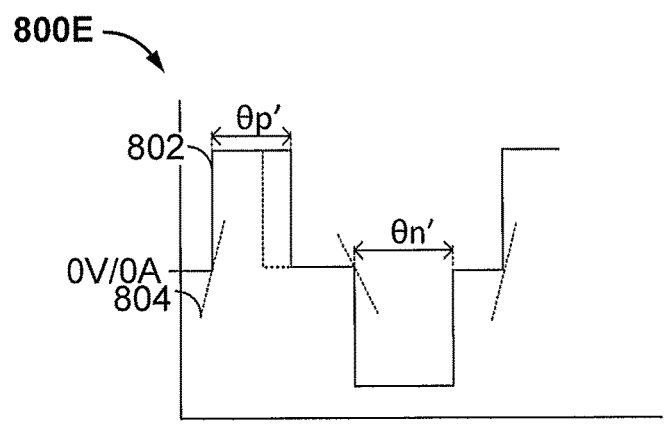

FIG. 8E shows a graph 800E of the output voltage 802 and current 804 waveforms associated with the inverter 700 of FIG. 7 under control of an asymmetrical driving scheme, in accordance with some implementations. The vertical axis represents voltage and current levels, while the horizontal axis represents passage of time. Once soft switching has been achieved, as previously described in connection with FIG. 8D, in some implementations the asymmetrical driving scheme may increase the positive $\theta_p$ and negative $\theta_n$ common conduction angles until new positive $\theta_{p'}$ and negative $\theta_{n'}$ common conduction angles have been achieved, while simultaneously decreasing the shifting angle β to substantially zero. In some implementations, this may have substantially no effect on the total duration of the negative portion of the voltage waveform 802, since the negative $\theta_n$ common conduction angle may be increased by the same amount that the shifting angle β is decreased. However, the duration of the positive portion of the voltage waveform 802 may increase until the durations of the positive and negative portions of the voltage waveform 802 are substantially the same again, bringing operation back into a symmetrical driving control pattern. Thus, as described for FIGS. 8A-8E, the control scheme may be symmetrical while ramping up to the predetermined percentage of full power, switch to an asymmetrical control scheme in order to achieve soft switching at rated power, and then adjust both the common conduction angles $\theta_p$ and $\theta_n$ and the shifting angle β to re-achieve a substantially symmetrical control scheme.

Figure 9B:
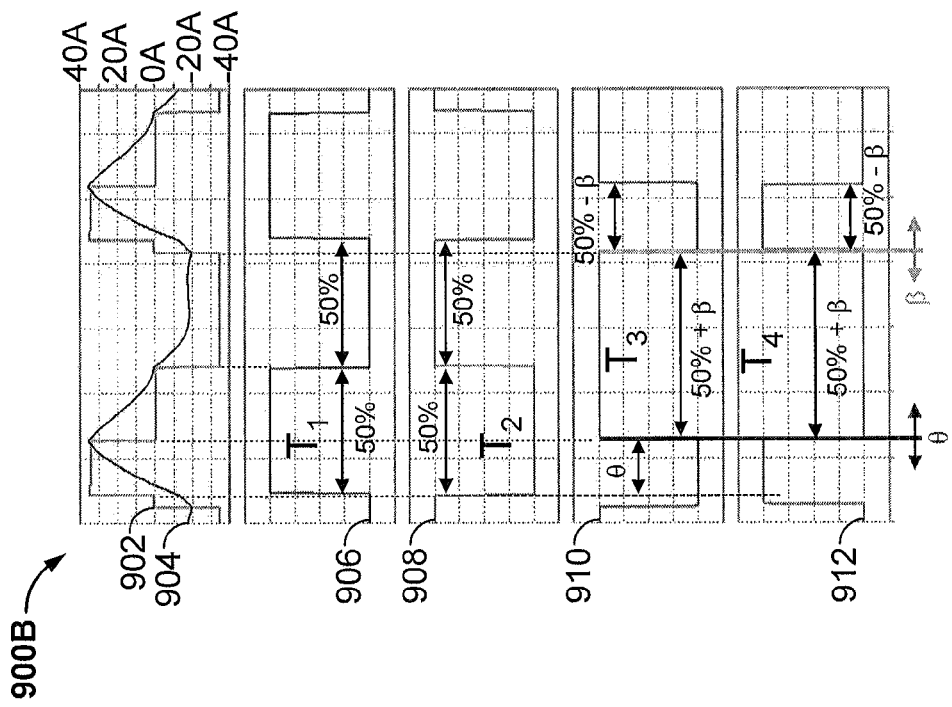
FIG. 9B shows a graph of output voltage and current waveforms for the inverter of FIG. 7 and associated driving signals for each switch in the inverter of FIG. 7 under a single-leg asymmetrical driving scheme resulting in soft switching, in accordance with some implementations.
Figure 9A:
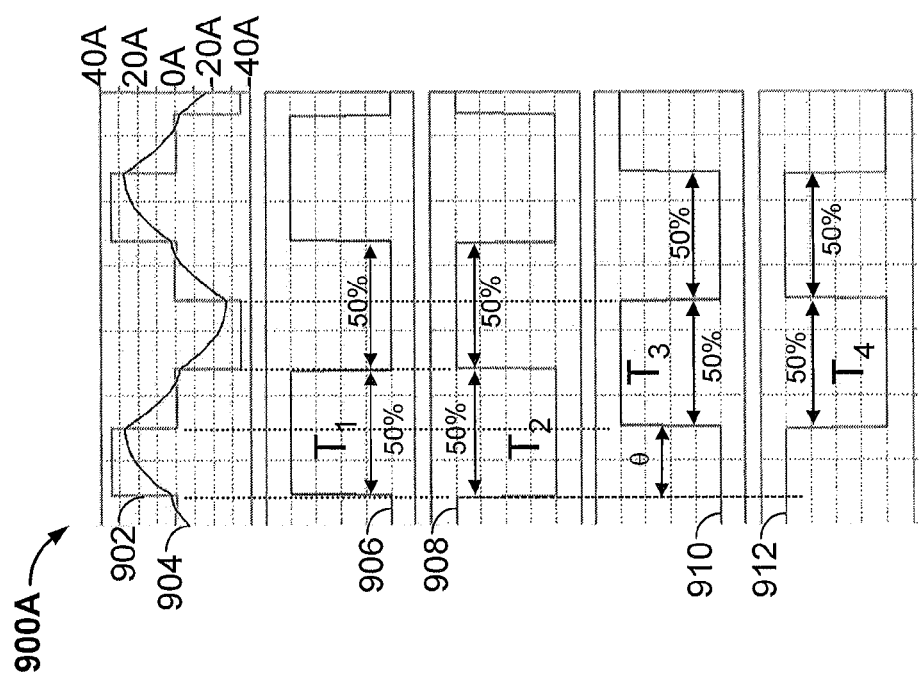
FIG. 9A shows a graph of output voltage and current waveforms for the inverter of FIG. 7 and associated driving signals for each switch in the inverter of FIG. 7 under a symmetrical driving scheme resulting in hard switching, in accordance with some implementations.

To more clearly understand the specifics of the control scheme of FIGS. 8A-8E, reference will now be made to FIGS. 9A and 9B. In some implementations, though the conduction angles of the positive portions and of the negative portions are not the same when FIGS. 9A and 9B are compared, a same amount of power may be transferred due to the total conduction times (e.g., the sum of the positive conduction angles and the negative conduction angles) being substantially the same. Thus, direct comparison between FIGS. 9A and 9B are possible.

FIG. 9A shows a graph 900A of output voltage 902 and current 904 waveforms for the inverter 700 of FIG. 7 and associated driving signals 906, 908, 910, 912 for each switch T1, T2, T3, T4 in the inverter 700 of FIG. 7 under a symmetrical driving scheme resulting in hard switching, in accordance with some implementations. In some implementations, the wireless power transfer system may be transferring 3.4 kW of power wirelessly while experiencing 3.5 A hard switching. In some implementations, the graph 900A may correspond to previously discussed FIG. 8B. With reference to FIG. 7, the switches T1 and T2 form the first leg of the inverter 700, while the switches T3 and T4 form the second leg of the inverter 700. Accordingly, only one of the switches T1 and T2 actively conduct at any time, while only one of the switches T3 and T4 will actively conduct at any time. For this reason, the voltage waveforms 906 and 908 will be reciprocally activated, while the voltage waveforms 910 and 912 will be reciprocally activated. Thus, the positive portion of the voltage waveform 902 is defined as the period of time during which the first leg of the inverter 700 is conducting from the positive voltage rail 702 and the second leg of the inverter 700 is conducting from the negative voltage rail 704. Likewise, the negative portion of the voltage waveform 902 is defined as the period of time during which the first leg of the inverter 700 is conducting from the negative voltage rail 704 and the second leg of the inverter 700 is conducting from the positive voltage rail 702. As shown in FIG. 9A, each of the driving signals 906 and 908 for switches T1 and T2, respectively, are conducting 50% of the time. Likewise, each of the driving signals 910 and 912 for switches T3 and T4, respectively, are conducting 50% of the time. This results in a symmetrical driving scheme, since the positive portion of the voltage waveform 902 has substantially the same duration as the negative portion of the voltage waveform 902. As shown, the total or net conduction angle is based on the time between the rising edges of the positive portion of the driving signals 906 and 910 for the switches T1 and T3.

FIG. 9B shows a graph 900B of output voltage 902 and current 904 waveforms for the inverter 700 of FIG. 7 and associated driving signals for each switch in the inverter 700 of FIG. 7 under a single-leg asymmetrical driving scheme resulting in soft switching, in accordance with some implementations. In some implementations, the wireless power transfer system may be transferring 3.4 kW of power wirelessly while experiencing soft switching. In some implementations, the graph 900B may correspond to previously discussed FIGS. 8C and 8D. As shown, the driving signals 906 and 908 are reciprocals of one another and switches T1 and T2 of the inverter 700 are each conducting 50% of the time. However, the drive signals 910 and 912, being reciprocals of one another, are adjusted from that shown in FIG. 9A such that the switch T3 is conducting 50+β % of the time, while the switch T4 is conducting 50-β % of the time. This has the net effect that the negative portion of the voltage waveform 902 will be increased in duration by the shifting angle β. Thus, the timing of the rising edge of the positive portion of the voltage waveform 902 depends upon the timing of the rising edge of the driving signal 902 of the switch T1 (and/or the falling edge of the driving signal 904 of the switch T2), while the timing of the falling edge of the positive portion of the voltage waveform 902 depends upon the timing of the rising edge of the driving signal 910 of the switch T3 (and/or the falling edge of the driving signal 912 of the switch T4). Likewise, the timing of the falling edge of the negative portion of the voltage waveform 902 depends upon the timing of the falling edge of the driving signal 902 of the switch T1 (and/or the rising edge of the driving signal 904 of the switch T2), while the timing of the rising edge of the negative portion of the voltage waveform 902 depends upon the timing of the falling edge of the driving signal 910 of the switch T3 (and/or the rising edge of the driving signal 912 of the switch T4). Thus, advancing the timing of the falling edge of the negative portion of the voltage waveform 902 requires advancing the timing of the falling edge of the drive signal 906 for the switch T1 (and the timing of the rising edge of the drive signal 908). Likewise, retarding the timing of the rising edge of the negative portion of the voltage waveform 902 requires retarding the timing of the falling edge of the drive signal 910 for the switch T3 (and the timing of the rising edge of the drive signal 912 for the switch T4). Adjusting the conduction angle θ includes adjusting the timing of the rising edge of the drive signal 910 for the switch T3 (and the timing of the falling edge of the drive signal 912 for the switch 914) with respect to the rising edge of the signal 906 for the switch T1.

Figure 10:
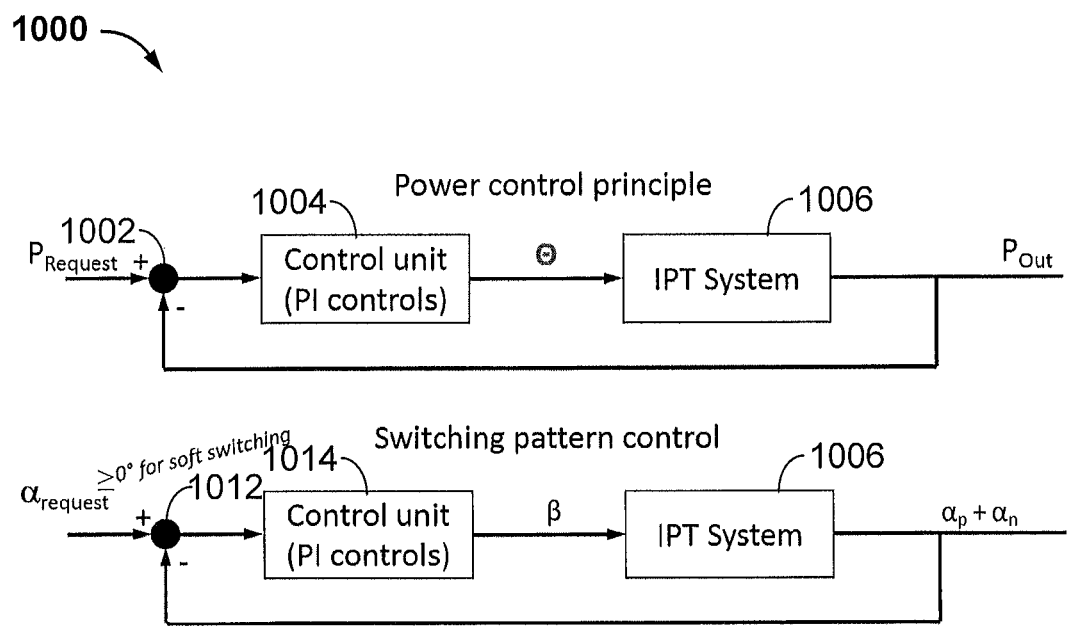
FIG. 10 shows a functional block diagram of a control system for adjusting a plurality of parameters associated with the inverter of FIG. 7, in accordance with some implementations.

FIG. 10 shows a functional block diagram of a control system 1000 for adjusting a plurality of parameters associated with the inverter 700 of FIG. 7, in accordance with some implementations. In some implementations, the control system 1000 may involve proportional integration control (PI control), although any other suitable type of control may be utilized. The control system 1000 may be configured to separately adjust the common conduction angle θ and the shifting angle β based on a power request $P_{request}$ and a switching angle request α, respectively. As shown, in a first control loop, a summer 1002 may receive a power request $P_{request}$ at a positive input and a feedback signal indicative of actual power output $P_{out}$ at a negative input. The output of the summer 1002 may be a difference between its positive and negative inputs and may be output to a control unit 1004, which may utilize this input and output a signal indicative of a common conduction angle θ to the IPT system 1006. The IPT system 1006 may operate with the common conduction angle θ, adjusted by the shifting angle β, and provide the output power $P_{out}$. The signal indicative of $P_{out}$ is fed back into the summer 1002 as previously described.

In a second control loop a switching angle request α≥0° is input to a positive input of a summer 1012 and a feedback signal indicative of a sum of an actual positive switching angle $α_p$ and an actual negative switching angle $α_n$ is fed back to a negative input of the summer 1012. In such implementations, a switching angle request α≥0° is utilized since a value of exactly 0 would include zero current switching, while an angle greater than or equal to 0 would include both zero current switching as well as zero voltage switching. An output of the summer 1012 is input to a control unit 1014. The control unit 1014 is configured to output a shifting angle β to the IPT system 1006 based on this input. The IPT system 1006 may be configured to measure the angle $α_p$ between a current zero point crossing and a following rising edge of the positive portion of the driving voltage waveform as well as the angle $α_n$ between a current zero point crossing and a following falling edge of the negative portion of the driving voltage waveform. The sum of $α_p$ and $α_n$ may be fed back to the negative input of the summer 1012. In some implementations, if one of $α_p$ and $α_n$ is positive while the other is negative, the positive one should be treated as a zero value until the negative one becomes zero or greater. This may be to avoid prematurely discontinuing the shifting while one of $α_p$ and $α_n$ is still negative and maintaining hard switching in one of the legs due to the remaining negative conduction angle. In this way, utilizing only single leg control (e.g., adjusting driving patterns for only the switches T3 and T4 of the inverter 700 of FIG. 7) soft switching may be achieved by separately controlling the common conduction angle θ and the shifting angle β, as previously described in connection with FIGS. 8A-9B, This second control loop may also be known as or provide at least a portion of means for advancing each of a rising edge and a falling edge of a positive portion of a voltage waveform, means for advancing a falling edge of a negative portion of the voltage waveform, and/or means for retarding a rising edge of the negative portion of the voltage waveform. Moreover, an advantage of such a control scheme is that by changing the shifting angle β smoothly, the system may automatically fall back to the symmetrical driving scheme (see FIGS. 5, 8A, 8B, 8E, 9A, 11A, 12A, 14A) once there is no shift necessary. Thus, with such a novel control strategy, either the best pattern (e.g., symmetrical or asymmetrical) or a transition between symmetrical and asymmetrical patterns is chosen by the control unit(s) to achieve soft switching above a predetermined minimum percentage of nominal output power (e.g., 20%).

Figures 11A, 11B:
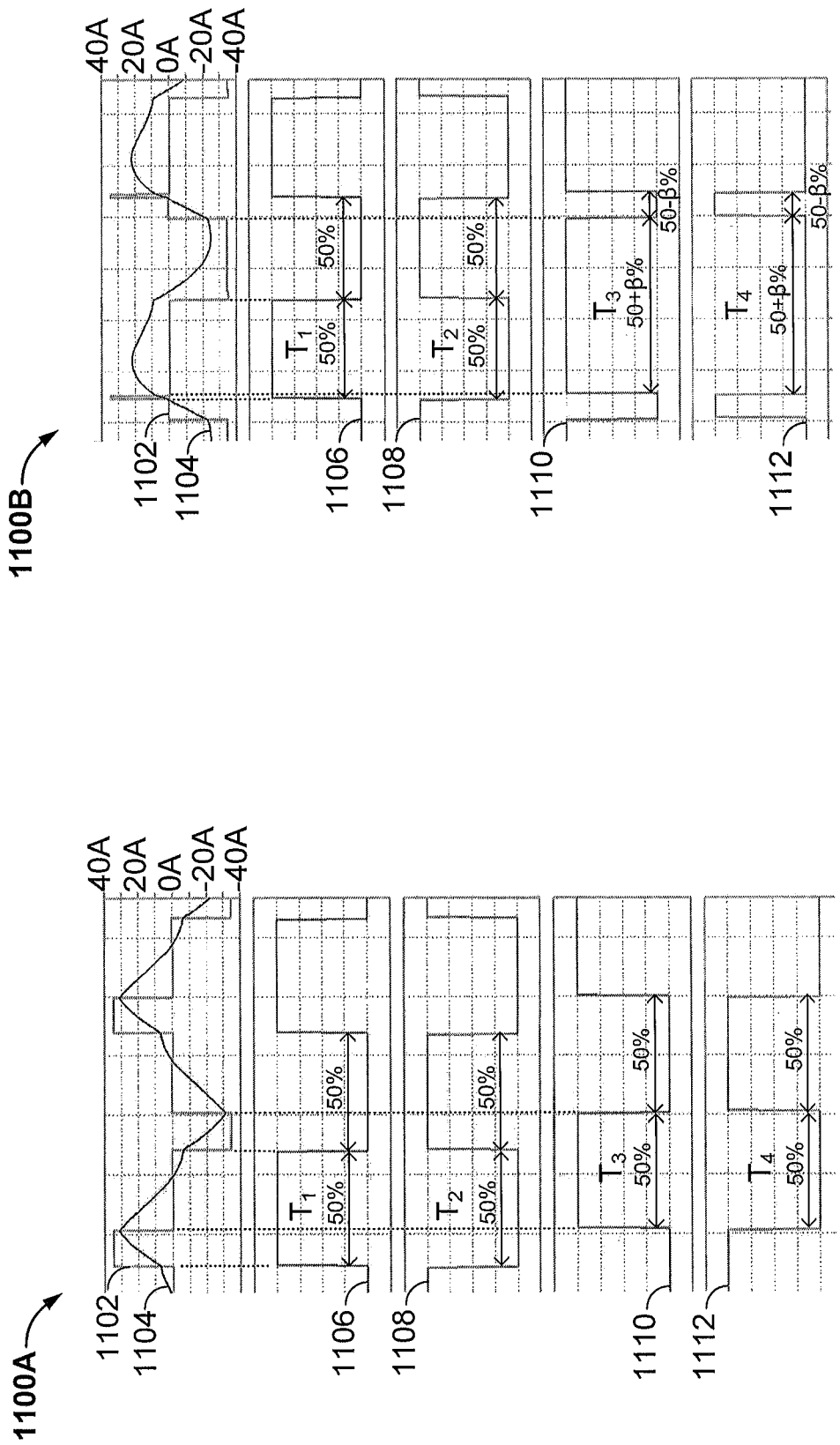
FIG. 11A shows a graph of output voltage and current waveforms for the inverter of FIG. 7 and associated driving signals for each switch in the inverter of FIG. 7 under another symmetrical driving scheme resulting in hard switching, in accordance with some implementations.
FIG. 11B shows a graph of output voltage and current waveforms for the inverter of FIG. 7 and associated driving signals for each switch in the inverter of FIG. 7 under another single-leg asymmetrical driving scheme resulting in soft switching, in accordance with some implementations.

FIG. 11A shows a graph 1100B of output voltage 1102 and current 1104 waveforms for the inverter 700 of FIG. 7 and associated driving signals 1106, 1108, 1110, 1112 for each switch T1, T2, T3, T4 in the inverter 700 of FIG. 7 under another symmetrical driving scheme resulting in hard switching, in accordance with some implementations. In some implementations, the wireless power transfer system may be transferring 2.1 kW of power wirelessly while experiencing 7 A hard switching. In some implementations, the graph 1100A may correspond to previously discussed FIG. 8B. The driving signals 1106 and 1108 are reciprocally activated, while the driving signals 1110 and 1112 are reciprocally activated. As shown in FIG. 11A, each of the driving signals 1106 and 1108 for switches T1 and T2, respectively, are conducting 50% of the time. Likewise, each of the driving signals 1110 and 1112 for switches T3 and T4, respectively, are conducting 50% of the time. This results in a symmetrical driving scheme, since applying the driving signals 1106, 1108, 1110, 1112 to the switches T1, T2, T3, T4, respectively, results in the positive portion of the voltage waveform 1102 having substantially the same duration as the negative portion of the voltage waveform 1102.

FIG. 11B shows a graph 1100B of output voltage 1102 and current 1104 waveforms for the inverter 700 of FIG. 7 and associated driving signals 1106, 1108, 1110, 1112 for each switch T1, T2, T3, T4 in the inverter 700 of FIG. 7 under a single-leg asymmetrical driving scheme resulting in soft switching, in accordance with some implementations. In some implementations, the wireless power transfer system may be transferring 2.1 kW of power wirelessly while experiencing soft switching. In some implementations, the graph 1100B may correspond to previously discussed FIGS. 8C and 8D. As shown, the driving signals 1106 and 1108 are reciprocals of one another and the switches T1 and T2 of the inverter 700 are each conducting 50% of the time. However, the drive signals 1110 and 1112, being reciprocals of one another, are adjusted from that shown in FIG. 11A such that the switch T3 is conducting 50+β % of the time, while the switch T4 is conducting 50-β % of the time. The timing of the rising edge of the positive portion of the voltage waveform 1102 depends upon the timing of the rising edge of the driving signal 1102 of the switch T1 (and/or the falling edge of the driving signal 1104 of the switch T2), while the timing of the falling edge of the positive portion of the voltage waveform 1102 depends upon the timing of the rising edge of the driving signal 1110 of the switch T3 (and/or the falling edge of the driving signal 1112 of the switch T4). Likewise, the timing of the falling edge of the negative portion of the voltage waveform 1102 depends upon the timing of the falling edge of the driving signal 1102 of the switch T1 (and/or the rising edge of the driving signal 1104 of the switch T2), while the timing of the rising edge of the negative portion of the voltage waveform 1102 depends upon the timing of the falling edge of the driving signal 1110 of the switch T3 (and/or the rising edge of the driving signal 1112 of the switch T4). Thus, a control scheme according to that shown in FIG. 11B effectively adjusts a shifting angle β for both the positive and negative portions of the voltage waveform 1102.

Figure 12B:
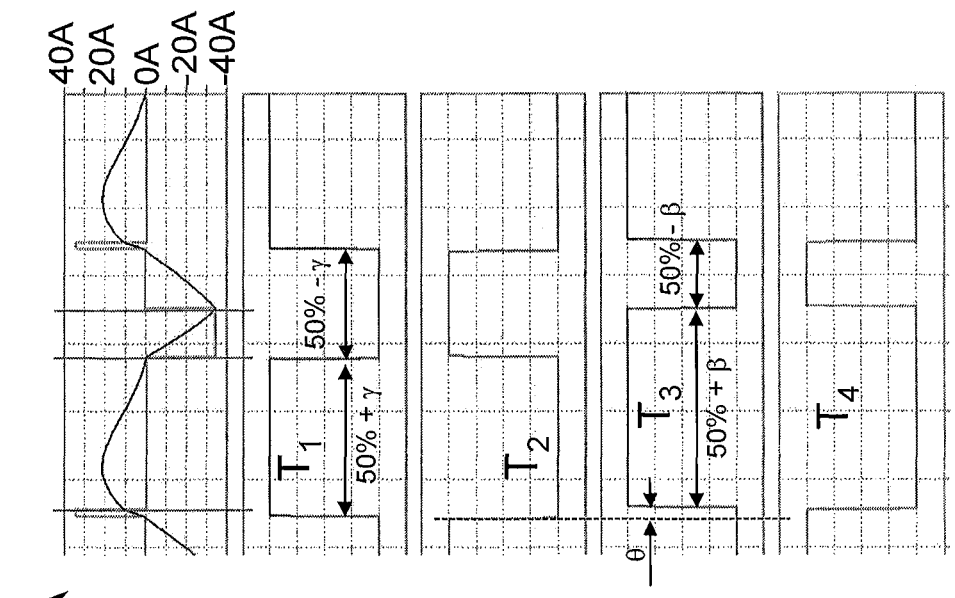
FIG. 12B shows a graph of output voltage and current waveforms for the inverter of FIG. 7 and associated driving signals for each switch in the inverter of FIG. 7 under a double-leg asymmetrical driving scheme resulting in soft switching, in accordance with some implementations.
Figure 12A:
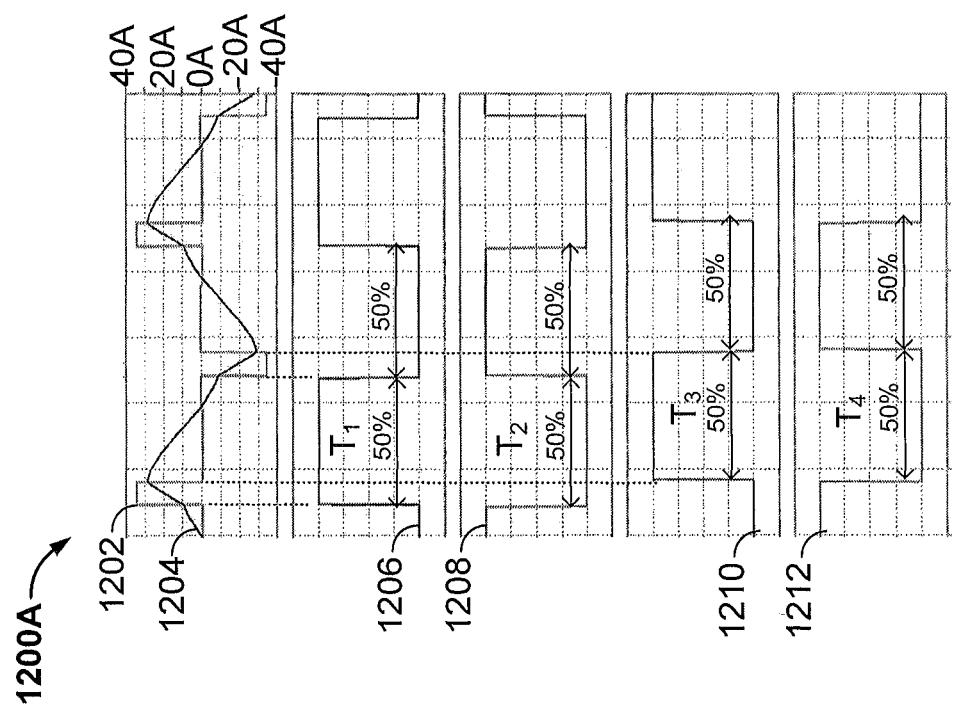
FIG. 12A shows a graph of output voltage and current waveforms for the inverter of FIG. 7 and associated driving signals for each switch in the inverter of FIG. 7 under yet another symmetrical driving scheme resulting in hard switching, in accordance with some implementations.

FIG. 12A shows a graph 1200A of output voltage 1202 and current 1204 waveforms for the inverter 700 of FIG. 7 and associated driving signals 1206, 1208, 1210, 1212 for each switch T1, T2, T3, T4 in the inverter 700 of FIG. 7 under yet another symmetrical driving scheme resulting in hard switching, in accordance with some implementations. In some implementations, the wireless power transfer system may be transferring 1.1 kW of power wirelessly while experiencing 10 A hard switching. In some implementations, the graph 1200A may correspond to previously discussed FIG. 8B. The driving signals 1206 and 1208 are reciprocally activated, while the driving signals 1210 and 1212 are reciprocally activated. As shown in FIG. 12A, each of the driving signals 1206 and 1208 for switches T1 and T2, respectively, are conducting 50% of the time. Likewise, each of the driving signals 1210 and 1212 for switches T3 and T4, respectively, are conducting 50% of the time. This results in a symmetrical driving scheme, since applying the driving signals 1206, 1208, 1210, 1212 to the switches T1, T2, T3, T4, respectively, results in the positive portion of the voltage waveform 1202 having substantially the same duration as the negative portion of the voltage waveform 1202.

FIG. 12B shows a graph 1200B of output voltage 1202 and current 1204 waveforms for the inverter 700 of FIG. 7 and associated driving signals 1206, 1208, 1210, 1212 for each switch T1, T2, T3, T4 in the inverter 700 of FIG. 7 under a double-leg asymmetrical driving scheme resulting in soft switching, in accordance with some implementations. In some implementations, the wireless power transfer system may be transferring 1.1 kW of power wirelessly while experiencing soft switching. In some implementations, the graph 1200B may correspond to previously discussed FIGS. 8C and 8D. As shown, the driving signals 1206 and 1208 are reciprocals of one another and are adjusted such that the switch T1 of the inverter 700 is conducting 50+γ % of the time and switch T2 is conducting 50-γ % of the time. The drive signals 1210 and 1212, being reciprocals of one another, are also adjusted from that shown in FIG. 12A such that the switch T3 is conducting 50+β % of the time, while the switch T4 is conducting 50-β % of the time. The timing of the rising edge of the positive portion of the voltage waveform 1202 depends upon the timing of the rising edge of the driving signal 1202 of the switch T1 (and/or the falling edge of the driving signal 1204 of the switch T2), while the timing of the falling edge of the positive portion of the voltage waveform 1202 depends upon the timing of the rising edge of the driving signal 1210 of the switch T3 (and/or the falling edge of the driving signal 1212 of the switch T4). Likewise, the timing of the falling edge of the negative portion of the voltage waveform 1202 depends upon the timing of the falling edge of the driving signal 1202 of the switch T1 (and/or the rising edge of the driving signal 1204 of the switch T2), while the timing of the rising edge of the negative portion of the voltage waveform 1202 depends upon the timing of the falling edge of the driving signal 1210 of the switch T3 (and/or the rising edge of the driving signal 1212 of the switch T4). Thus, a control scheme according to that shown in FIG. 12B effectively adjusts a first shifting angle β for the positive portion of the voltage waveform 1202 and a separate second shifting angle γ for the negative portion of the voltage waveform 1202, as will be more apparent in connection with the discussion of FIG. 13 below. Moreover, such double-leg asymmetrical switching offers the potential to reduce power transfer to lower values while maintaining soft switching as compared to single-leg asymmetrical switching modes.

Figure 13:
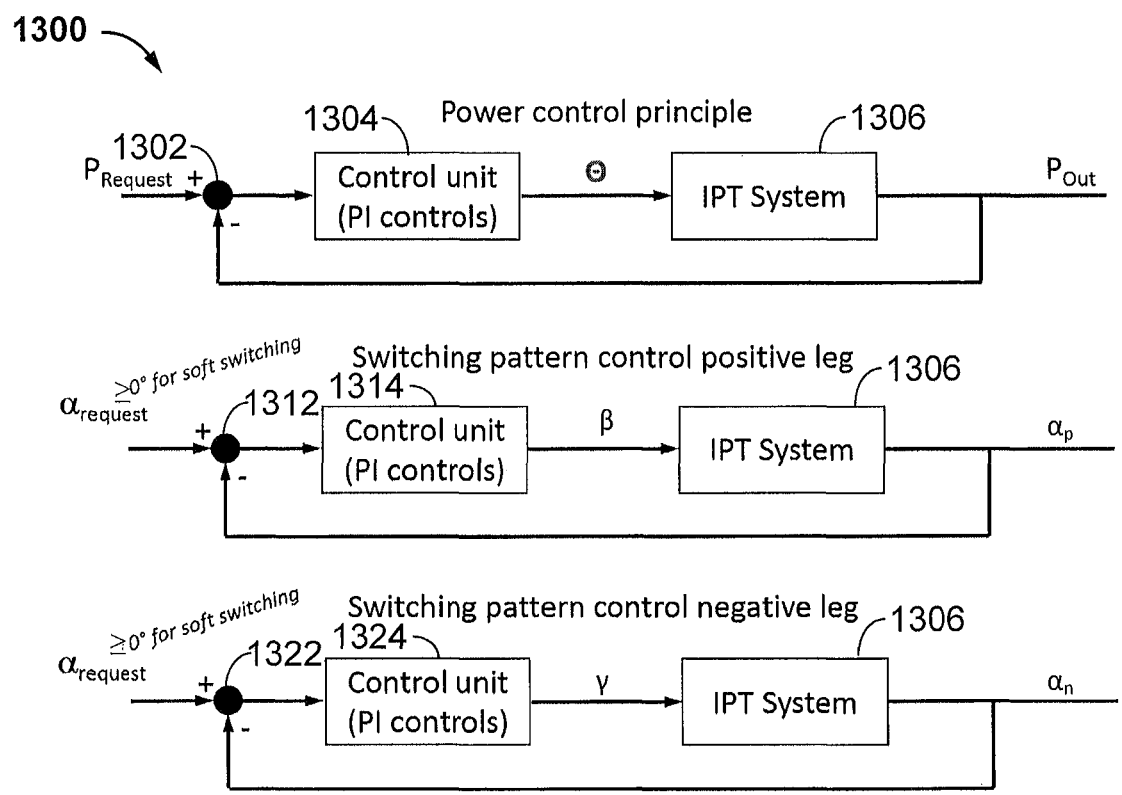
FIG. 13 shows another functional block diagram of another control system for adjusting a plurality of parameters associated with the inverter of FIG. 7, in accordance with some implementations.
Figure 14:
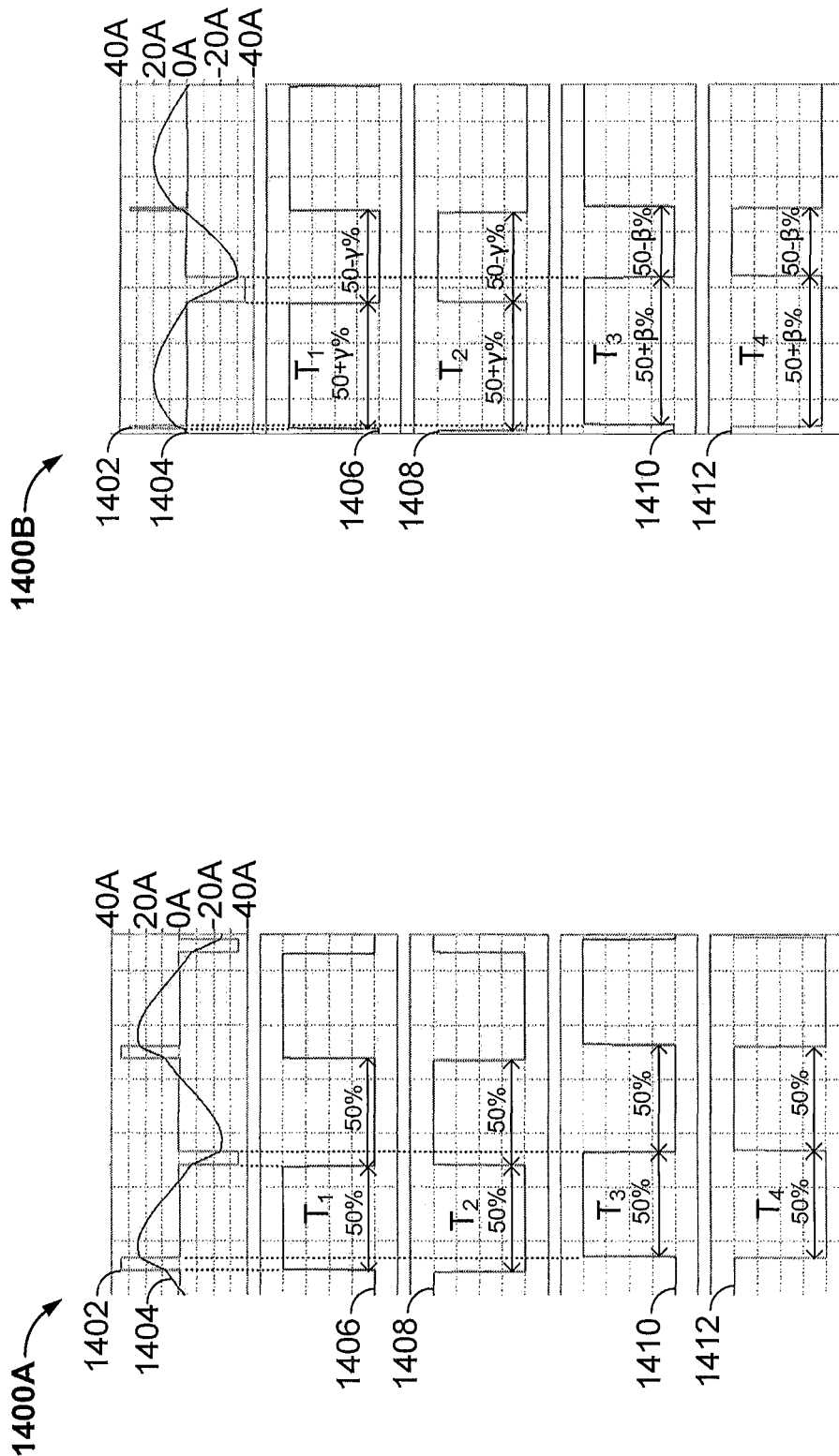
FIG. 14A shows a graph of output voltage and current waveforms for the inverter of FIG. 7 and associated driving signals for each switch in the inverter of FIG. 7 under yet another symmetrical driving scheme resulting in hard switching, in accordance with some implementations.
FIG. 14B shows a graph of output voltage and current waveforms for the inverter of FIG. 7 and associated driving signals for each switch in the inverter of FIG. 7 under another double-leg asymmetrical driving scheme resulting in reduced hard switching, in accordance with some implementations.

FIG. 13 shows another functional block diagram of another control system 1300 for adjusting a plurality of parameters associated with the inverter 700 of FIG. 7, in accordance with some implementations. The control system 1300 may be configured to separately adjust the common conduction angle θ, the shifting angle β, and the shifting angle γ based on a power request $P_{request}$ and a switching angle request α, respectively. As shown, in a first control loop, a summer 1302 may receive a power request $P_{request}$ at a positive input and a feedback signal indicative of actual power output at a negative input. The output of the summer 1302 may be a difference between its positive and negative inputs and may be output to a control unit 1304, which may utilize this input and output a signal indicative of a common conduction angle θ to the IPT system 1306. The IPT system 1306 may operate with the common conduction angle θ and provide an output power $P_{out}$. A signal indicative of $P_{out}$ is fed back into the summer 1302 as previously described.

In a second control loop a switching angle request α≥0° is input to a positive input of a summer 1312 and a feedback signal indicative of an actual positive switching angle $α_p$ is fed back to a negative input of the summer 1312. An output of the summer 1312 is input to a control unit 1314. The control unit 1314 is configured to output the shifting angle β to the IPT system 1306 based on this input. The IPT system 1306 may be configured to measure the angle $α_p$ between the current zero point crossing and the rising edge of the positive portion of the driving voltage waveform. $α_p$ may be fed back to the negative input of the summer 1312.

The second control loop may also be known as or may provide at least a portion of means for advancing each of a rising edge and a falling edge of the positive portion of the second voltage waveform.

In a third control loop the switching angle request α≥0° is input to a positive input of a summer 1322 and a feedback signal indicative of an actual negative switching angle $α_n$ is fed back to a negative input of the summer 1322. An output of the summer 1322 is input to a control unit 1324. The control unit 1324 is configured to output the shifting angle γ to the IPT system 1306 based on this input. The IPT system 1306 may be configured to measure the angle $α_n$ between the current zero point crossing and the falling edge of the negative portion of the driving voltage waveform. $α_n$ may be fed back to the negative input of the summer 1322. In this way, utilizing double-leg control (e.g., adjusting driving patterns for each of the switches T1 through T4 of the inverter 700 of FIG. 7) soft switching may be achieved by separately controlling the common conduction angle θ and the shifting angles β and γ, similar to that previously described in connection with FIGS. 8A-8E and 11A-12B. The third control loop may also be known as or may provide at least a portion of means for advancing a falling edge of a negative portion of the voltage waveform and/or means for retarding a rising edge of the negative portion of the voltage waveform.

FIG. 14A shows a graph 1400A of output voltage 1402 and current 1404 waveforms for the inverter 700 of FIG. 7 and associated driving signals 1406, 1408, 1410, 1412 for each switch T1, T2, T3, T4 in the inverter 700 of FIG. 7 under yet another symmetrical driving scheme resulting in hard switching, in accordance with some implementations. In some implementations, the wireless power transfer system may be transferring 0.5 kW of power wirelessly while experiencing 8 A hard switching. In some implementations, the graph 1400A may correspond to previously discussed FIG. 8B. The driving signals 1406 and 1408 are reciprocally activated, while the driving signals 1410 and 1412 are reciprocally activated. As shown in FIG. 14A, each of the driving signals 1406 and 1408 for switches T1 and T2, respectively, are conducting 50% of the time. Likewise, each of the driving signals 1410 and 1412 for switches T3 and T4, respectively, are conducting 50% of the time. This results in a symmetrical driving scheme, since applying the driving signals 1406, 1408, 1410, 1412 to the switches T1, T2, T3, T4, respectively, results in the positive portion of the voltage waveform 1402 having substantially the same duration as the negative portion of the voltage waveform 1402.

FIG. 14B shows a graph 1400B of output voltage 1402 and current 1404 waveforms for the inverter 700 of FIG. 7 and associated driving signals 1406, 1408, 1410, 1412 for each switch T1, T2, T3, T4 in the inverter 700 of FIG. 7 under another double-leg asymmetrical driving scheme resulting in reduced hard switching, in accordance with some implementations. In some implementations, the wireless power transfer system may be transferring 0.5 kW of power wirelessly while experiencing 1.5 A hard switching, which is substantially lower than the 8A hard switching that occurs during with the symmetrical driving control shown in FIG. 14A. In some implementations, the graph 1400B may correspond to previously discussed FIGS. 8C and 8D. As shown, the driving signals 1406 and 1408 are reciprocals of one another and are adjusted such that the switch T1 of the inverter 700 is conducting 50+γ % of the time and switch T2 is conducting 50−γ % of the time. The drive signals 1410 and 1412, being reciprocals of one another, are also adjusted from that shown in FIG. 14A such that the switch T3 is conducting 50+β % of the time, while the switch T4 is conducting 50−β % of the time. The timing of the rising edge of the positive portion of the voltage waveform 1402 depends upon the timing of the rising edge of the driving signal 1402 of the switch T1 (and/or the falling edge of the driving signal 1404 of the switch T2), while the timing of the falling edge of the positive portion of the voltage waveform 1402 depends upon the timing of the rising edge of the driving signal 1410 of the switch T3 (and/or the falling edge of the driving signal 1412 of the switch T4). Likewise, the timing of the falling edge of the negative portion of the voltage waveform 1402 depends upon the timing of the falling edge of the driving signal 1402 of the switch T1 (and/or the rising edge of the driving signal 1404 of the switch T2), while the timing of the rising edge of the negative portion of the voltage waveform 1402 depends upon the timing of the falling edge of the driving signal 1410 of the switch T3 (and/or the rising edge of the driving signal 1412 of the switch T4). Thus, a control scheme according to that shown in FIG. 14B effectively adjusts a shifting angle β for the positive portion of the voltage waveform 1402 and a separate shifting angle γ for the negative portion of the voltage waveform 1402 to achieve substantially reduced current hard switching or even soft switching, as will be more apparent in connection with the discussion of FIG. 13 below.

Figure 15:
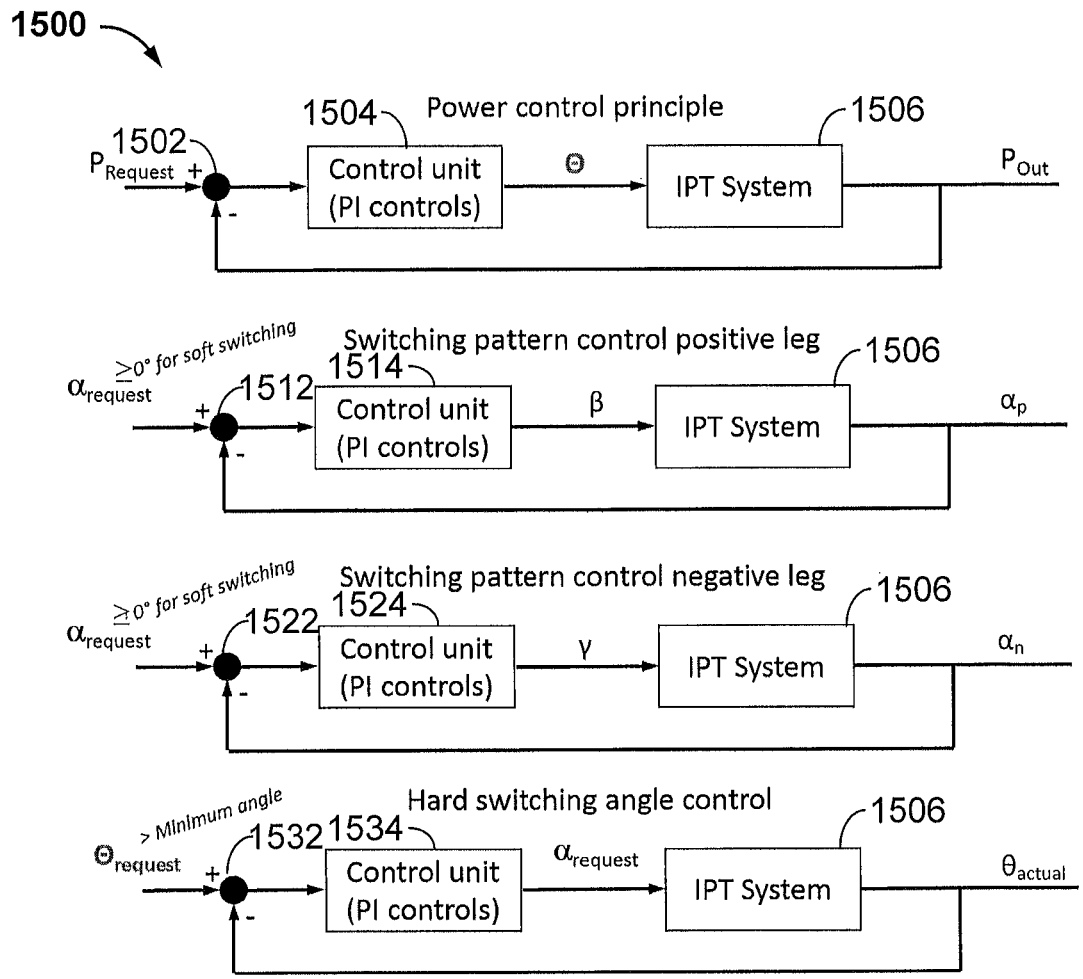
FIG. 15 shows another functional block diagram of another control system for adjusting a plurality of parameters associated with the inverter of FIG. 7, in accordance with some implementations.

FIG. 15 shows another functional block diagram of another control system 1500 for adjusting a plurality of parameters associated with the inverter 700 of FIG. 7, in accordance with some implementations. The control system 1500 may be configured to separately adjust the common conduction angle θ, the shifting angle β, the shifting angle γ, and a switching angle α. As shown, in a first control loop, a summer 1502 may receive a power request $P_{request}$ at a positive input and a feedback signal indicative of actual power output at a negative input. The output of the summer 1502 may be a difference between its positive and negative inputs and may be output to a control unit 1504, which may utilize this input and output a signal indicative of a common conduction angle θ to the IPT system 1506. The IPT system 1506 may operate based on this requested common conduction angle θ and provide an output power $P_{out}$. A signal indicative of $P_{out}$ is fed back into the summer 1502 as previously described.

In a second control loop a switching angle request α≥0° is input to a positive input of a summer 1512 and a feedback signal indicative of an actual positive switching angle $α_p$ is fed back to a negative input of the summer 1512. An output of the summer 1512 is input to a control unit 1514. The control unit 1514 is configured to output the shifting angle β to the IPT system 1506 based on this input. The IPT system 1506 may be configured to measure the angle $α_p$ between the current zero point crossing and the rising edge of the positive portion of the driving voltage waveform. $α_p$ may be fed back to the negative input of the summer 1512. The second control loop may also be known as or may provide at least a portion of means for advancing each of a rising edge and a falling edge of the positive portion of the second voltage waveform.

In a third control loop the switching angle request α≥0° is input to a positive input of a summer 1522 and a feedback signal indicative of an actual negative switching angle $α_n$ is fed back to a negative input of the summer 1522. An output of the summer 1522 is input to a control unit 1524. The control unit 1524 is configured to output the shifting angle γ to the IPT system 1506 based on this input. The IPT system 1506 may be configured to measure the angle $α_n$ between the current zero point crossing and the falling edge of the negative portion of the driving voltage waveform. $\alpha_n$ may be fed back to the negative input of the summer 1522. The third control loop may also be known as or may provide at least a portion of means for advancing a falling edge of a negative portion of the voltage waveform and/or means for retarding a rising edge of the negative portion of the voltage waveform.

In a fourth control loop the requested conducting angle $\theta_{request}$, which may be greater than some minimum angle (e.g., equivalent to the predetermined percentage of nominal power), is input to a positive input of a summer 1532 and a feedback signal indicative of an actual common conduction angle $\theta_{actual}$ is fed back to a negative input of the summer 1532. An output of the summer 1532 is input to a control unit 1534. The control unit 1534 is configured to output a requested switching angle $\alpha_{request}$ to the IPT system 1506 based on this input. The IPT system 1506 may be configured to measure the actual common conduction angle $\theta_{actual}$ between the current zero point crossing and the falling edge of the negative portion of the driving voltage waveform. $\theta_{actual}$ may be fed back to the negative input of the summer 1532. In this way, utilizing double-leg control (e.g., adjusting driving patterns for each of the switches T1 through T4 of the inverter 700 of FIG. 7) soft switching (or at least substantially reduced current hard switching) may be achieved by separately controlling the common conduction angle $\theta$, the shifting angles $\beta$ and $\gamma$, and the switching angle $\alpha_{request}$ as previously described in connection with FIGS. 8A-8E and 14A-14B. By allowing small amounts of hard switching it is possible to completely ramp power transfer down to zero, Thus, a minimum conduction angle for utilizing this control scheme would not apply.

Figure 16:
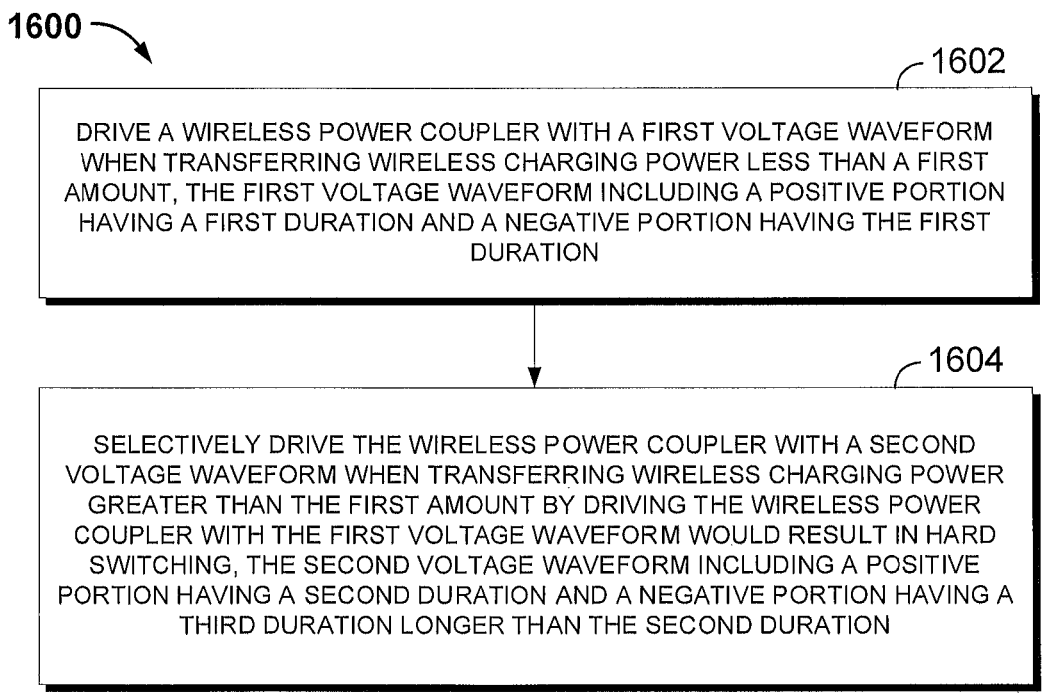
FIG. 16 is a flowchart depicting a method for implementing hybrid symmetric and asymmetric control for soft switching in wireless power transfer applications, in accordance with some implementations.

FIG. 16 is a flowchart 1600 depicting a method for implementing hybrid symmetric and asymmetric control for soft switching in wireless power transfer applications, in accordance with some implementations. The method of flowchart 1600 is described herein with reference to a control unit, such as any of the control units 1004, 1014, 1304, 1314, 1324, 1504, 1514, 1524, 1534 of FIG. 10, 13 or 15, and/or a driver circuit, such as the base power converter and inverter 336 of FIG. 3, the inverter 404 of FIG. 4, and/or the inverter 700 of FIG. 7. The method described in part by flowchart 1600 may track one or more aspects as previously described in connection with any of FIGS. 4-15. Although the method of flowchart 1600 is described herein with reference to a particular order, in various implementations, blocks herein may be performed in a different order, or omitted, and additional blocks may be added.

The flowchart 1600 may start with block 1602, which includes driving a wireless power coupler with a first voltage waveform when transferring wireless charging power less than a first amount, the first voltage waveform including a positive portion having a first duration and a negative portion having the first duration. For example, as previously described in connection with at least FIGS. 5, 8A, and 8B, when wireless charging power is transmitted in an amount less than some predetermined percentage of the IPT system's nominal power output (e.g., 20%), a symmetrical driving scheme is utilized, where the positive net conduction angle (and common conduction angle $\theta_p$) (e.g., the total duration of the positive portion of the voltage waveform) is the same as the negative net common conduction angle (and common conduction angle $\theta_n$) (e.g., the total duration of the negative portion of the voltage waveform). Although hard switching may occur during such low power transfer, the power dissipated in the switches of a driving circuit (e.g., the inverter 404 of FIG. 4) are low enough that heat buildup will not be substantial and damage to the switches due to hard switching will not pose a substantial risk.

The flowchart 1600 may then advance to block 1604, which includes selectively driving the wireless power coupler with a second voltage waveform when transferring wireless charging power greater than the first amount, the second voltage waveform including a positive portion having a second duration and a negative portion having a third duration that is not equal to the second duration. For example, as previously described in connection with at least FIGS. 6, and 8C-8E, when wireless charging power is transmitted in an amount greater than the predetermined percentage of the IPT system's nominal power output (e.g., 20%), and when utilizing the symmetrical driving scheme described in connection with FIG. 5 would result in hard switching, an asymmetrical driving scheme is utilized, where the positive net conduction angle $\theta_p$ (e.g., the total duration of the positive portion of the voltage waveform) is not the same as the negative net conduction angle $\theta_n$ (e.g., the total duration of the negative portion of the voltage waveform).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, means for wirelessly transmitting the charging power may comprise any transmit coil or coupler as previously described in connection with any figure. Likewise, means for driving and/or means for selectively driving may comprise any control unit described in connection with any figure, e.g., the control unit 432 of FIG. 4, or any of the control units 1004, 1014, 1304, 1314, 1324, 1504, 1514, 1524, 1534 of FIG. 10, 13 or 15.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations of the invention.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory, computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media.

For purposes of summarizing the disclosure, certain aspects, advantages and novel features of the inventions have been described herein. It is to be understood that not necessarily all such advantages may be achieved in accordance with any particular implementation of the invention. Thus, the invention may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An apparatus for wirelessly transferring charging power, the apparatus comprising:
    a wireless power coupler;
    a driver circuit configured to drive the wireless power coupler with first and second voltage waveforms; and
    a control unit configured to:
        when transferring wireless charging power at less than a first percentage of a nominal power level of the driver circuit and the wireless power coupler, instruct the driver circuit to drive the wireless power coupler with the first voltage waveform including a positive portion having a first duration and a negative portion having the first duration, wherein the wireless power coupler transfers wireless charging power at a first efficiency while utilizing the first voltage waveform, and
        when transferring wireless charging power at above the first percentage of the nominal power level, selectively instruct the driver circuit to drive the wireless power coupler with the second voltage waveform including a positive portion having a second duration and a negative portion having a third duration that is not equal to the second duration, wherein the wireless power coupler transfers wireless charging power at a second efficiency while utilizing the second voltage waveform,
        wherein the first efficiency while utilizing the first voltage waveform at less than the first percentage of the nominal power is greater than the second efficiency while utilizing the second voltage waveform at less than the first percentage of the nominal power,
        wherein the driver circuit is configured to generate the second voltage waveform based on advancing a rising edge of the positive portion and delaying a rising edge of the negative portion of the first voltage waveform.

2. The apparatus of claim 1, wherein the control unit is further configured to:
    measure a switching angle comprising a phase angle between a zero point crossing of an output current and a zero point crossing of the second voltage waveform; and
    instruct the driver circuit to advance each of the rising edge and a falling edge of the positive portion of the second voltage waveform by a shifting angle based on the switching angle such that no output current circulates in the wireless power coupler at the advanced rising edge of the positive portion of the second voltage waveform.

3. The apparatus of claim 1, wherein the control unit is further configured to instruct the driver circuit to advance a falling edge of the negative portion of the second voltage waveform by a shifting angle such that no output current circulates in the wireless power coupler at the advanced falling edge of the negative portion of the second voltage waveform.

4. The apparatus of claim 3, wherein the control unit is further configured to instruct the driver circuit to retard the rising edge of the negative portion of the second voltage waveform by the shifting angle.

5. The apparatus of claim 3, wherein the control unit is further configured to instruct the driver circuit to increase the wireless charging power transmitted to a second percentage greater than the first percentage by incrementally increasing the duration of the positive portion of the second voltage waveform from the second duration to the third duration.

6. The apparatus of claim 1, wherein the control unit is further configured to separately control a conduction angle common to each of the positive portion and the negative portion of the second voltage waveform and at least one shifting angle that may be applied to each of the rising edge and a falling edge of at least one of the positive and negative portions of the second voltage waveform.

7. The apparatus of claim 6, wherein the shifting angle comprises:
    a first shifting angle applied to each of the rising edge and the falling edge of the positive portion of the second voltage waveform; and
    a second shifting angle applied to each of the rising edge and the falling edge of the negative portion of the second voltage waveform.

8. A method for wirelessly transferring charging power via a magnetic field generated by a wireless power coupler driven by a driver circuit with first and second voltage waveforms, the method comprising:

when wirelessly transferring charging power at less than a first percentage of a nominal power level of the driver circuit and the wireless power coupler, driving the wireless power coupler with the first voltage waveform including a positive portion having a first duration and a negative portion having the first duration, wherein the wireless power coupler transfers wireless charging power at a first efficiency while utilizing the first voltage waveform, when wirelessly transferring charging power at above the first percentage of the nominal power level, selectively driving the wireless power coupler with the second voltage waveform including a positive portion having a second duration and a negative portion having a third duration that is not equal to the second duration, wherein the wireless power coupler transfers wireless charging power at a second efficiency while utilizing the second voltage waveform, and generating the second voltage waveform, via the driver circuit, based on advancing a rising edge of the positive portion and delaying a rising edge of the negative portion of the first voltage waveform, wherein the first efficiency while utilizing the first voltage waveform at less than the first percentage of the nominal power is greater than the second efficiency while utilizing the second voltage waveform at less than the first percentage of the nominal power.

9. The method of claim 8, wherein driving the wireless power coupler with the second voltage waveform comprises advancing each of the rising edge and a falling edge of the positive portion of the second voltage waveform by a shifting angle such that no current circulates in the wireless power coupler at the rising edge of the positive portion of the second voltage waveform.

10. The method of claim 8, wherein driving the wireless power coupler with the second voltage waveform comprises advancing a falling edge of the negative portion of the second voltage waveform by a shifting angle such that no current circulates in the wireless power coupler at the falling edge of the negative portion of the second voltage waveform.

11. The method of claim 10, wherein driving the wireless power coupler with the second voltage waveform comprises retarding the rising edge of the negative portion of the second voltage waveform by the shifting angle.

12. The method of claim 10, further comprising increasing the wireless charging power transmitted by incrementally increasing the duration of the positive portion of the second voltage waveform from the second duration to the third duration.

13. The method of claim 8, wherein driving the wireless power coupler with the second voltage waveform further comprises separately controlling a conduction angle common to each of the positive portion and the negative portion of the second voltage waveform and at least one shifting angle that may be applied to each of the rising edge and a falling edge of at least one of the positive and negative portions of the second voltage waveform.

14. The method of claim 13, wherein the shifting angle comprises:
a first shifting angle applied to each of the rising edge and the falling edge of the positive portion of the second voltage waveform; and
a second shifting angle applied to each of the rising edge and the falling edge of the negative portion of the second voltage waveform.

15. A non-transitory, computer-readable medium comprising code that, when executed, causes an apparatus for wirelessly transferring charging power via a magnetic field generated by a wireless power coupler driven by a driver circuit with first and second voltage waveforms to:
when transferring wireless charging power at less than a first percentage of a nominal power level of the driver circuit and the wireless power coupler, drive the wireless power coupler with the first voltage waveform including a positive portion having a first duration and a negative portion having the first duration, wherein the wireless power coupler transfers wireless charging power at a first efficiency while utilizing the first voltage waveform, when transferring wireless charging power at above the first percentage of the nominal power level, selectively drive the wireless power coupler with the second voltage waveform including a positive portion having a second duration and a negative portion having a third duration that is not equal to the second duration, wherein the wireless power coupler transfers wireless charging power at a second efficiency while utilizing the second voltage waveform, and generate the second voltage waveform, via the driver circuit, based on advancing a rising edge of the positive portion and delaying a rising edge of the negative portion of the first voltage waveform, wherein the first efficiency while utilizing the first voltage waveform at less than the first percentage of the nominal power is greater than the second efficiency while utilizing the second voltage waveform at less than the first percentage of the nominal power.

16. The medium of claim 15, wherein the code, when executed, further causes the apparatus to advance each of the rising edge and a falling edge of the positive portion of the second voltage waveform by a shifting angle such that no current circulates in the wireless power coupler at the rising edge of the positive portion of the second voltage waveform.

17. The medium of claim 15, wherein the code, when executed, further causes the apparatus to advance a falling edge of the negative portion of the second voltage waveform by a shifting angle such that no current circulates in the wireless power coupler at the falling edge of the negative portion of the second voltage waveform.

18. The medium of claim 17, wherein the code, when executed, further causes the apparatus to retard the rising edge of the negative portion of the second voltage waveform by the shifting angle.

19. The medium of claim 17, wherein the code, when executed, further causes the apparatus to increase the wireless charging power transmitted to a second percentage greater than the first percentage by incrementally increasing the duration of the positive portion of the second voltage waveform from the second duration to the third duration.

20. The medium of claim 15, wherein the code, when executed, further causes the apparatus to separately control a conduction angle common to each of the positive portion and the negative portion of the second voltage waveform, and at least one shifting angle that may be applied to each of the rising edge and a falling edge of at least one of the positive and negative portions of the second voltage waveform.

21. The medium of claim 20, wherein the shifting angle comprises:
a first shifting angle applied to each of the rising edge and the falling edge of the positive portion of the second voltage waveform; and a second shifting angle applied to each of the rising edge and the falling edge of the negative portion of the second voltage waveform.

\* \* \* \* \*